(12) United States Patent
Gil et al.

(10) Patent No.: US 7,768,672 B2
(45) Date of Patent: Aug. 3, 2010

(54) SPOT COLOR CONTROL SYSTEM AND METHOD

(75) Inventors: Alvaro Enrique Gil, Rochester, NY (US); Lalit Keshav Mestha, Fairport, NY (US); Matthew F. Hoffmann, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 333 days.

(21) Appl. No.: 11/906,854

(22) Filed: Oct. 4, 2007

(65) Prior Publication Data

US 2008/0043271 A1   Feb. 21, 2008

(51) Int. Cl.
*H04N 1/60* (2006.01)
*H04N 1/46* (2006.01)
*G03F 3/08* (2006.01)
*G06K 9/00* (2006.01)

(52) U.S. Cl. .................. 358/1.9; 358/504; 358/518; 358/520; 358/523; 358/524; 382/162; 382/167

(58) Field of Classification Search .............. 358/1.9, 358/518, 520, 523, 525, 504; 382/162, 167
See application file for complete search history.

(56) References Cited

U.S. PATENT DOCUMENTS

| 5,452,094 | A | 9/1995 | Ebner et al. |
| 5,699,491 | A * | 12/1997 | Barzel .................. 358/1.9 |
| 6,157,469 | A | 12/2000 | Mestha |
| 6,178,007 | B1 | 1/2001 | Harrington |
| 6,222,648 | B1 | 4/2001 | Wolf et al. |
| 6,344,902 | B1 | 2/2002 | Duke et al. |
| 6,636,628 | B1 | 10/2003 | Wang et al. |
| 6,744,531 | B1 * | 6/2004 | Mestha et al. ............ 358/1.9 |
| 6,809,837 | B1 | 10/2004 | Mestha et al. |
| 6,934,053 | B1 | 8/2005 | Mestha et al. |
| 6,954,549 | B2 * | 10/2005 | Kraft .................... 382/167 |
| 7,069,164 | B2 | 6/2006 | Viturro et al. |
| 7,110,143 | B2 | 9/2006 | Bares et al. |
| 2002/0093684 | A1 | 7/2002 | Bares et al. |
| 2004/0141193 | A1 | 7/2004 | Mestha |
| 2005/0030560 | A1 | 2/2005 | Maltz et al. |

OTHER PUBLICATIONS

U.S. Appl. No. 11/507,405, filed Aug. 21, 2006, Gil et al.
U.S. Appl. No. 11/507,406, filed Aug. 21, 2006, Gil et al.

* cited by examiner

*Primary Examiner*—Edward L Coles
*Assistant Examiner*—Charlotte M Baker
(74) *Attorney, Agent, or Firm*—Fay Sharpe LLP

(57) ABSTRACT

This disclosure relates generally to methods and systems for color management in image/text printing or display systems, and more particularly to a system and method for automatically achieving spot color production through use of a plurality of gain matrices per spot color in determining spot color coordinates. Furthermore, this disclosure provides a means for mapping out-of-gamut target spot colors substantially near a boundary of the gamut of an image output device, such as a printer or display.

17 Claims, 15 Drawing Sheets

SPOT COLOR CONTROL SYSTEM AND METHOD

CROSS REFERENCE TO RELATED PATENTS AND APPLICATIONS

The following applications, U.S. application Ser. No. 11/507,405, filed Aug. 21, 2006, titled "System and Method for Automated Spot Color Editor," and U.S. application Ser. No. 11/507,406, filed Aug. 21, 2006, titled "Spot Color Controls and Method," are assigned to the same assignee of the present application. The entire disclosure of these applications are totally incorporated herein by reference in their entirety.

BACKGROUND

This disclosure relates generally to methods and systems for color management in image/text printing or display systems, and more particularly to a system and method for automatically achieving spot color production through use of a plurality of gain matrices per spot color in determining spot color coordinates. Furthermore, this disclosure provides a means for mapping out-of-gamut target spot colors substantially near a boundary of the gamut of an image output device, such as a printer or display.

To meet customer demand, the commercial printing industry requires the capability of producing spot colors accurately and consistently. Spot colors can be defined as a fixed set of colors which may be Pantone® colors, customer logo colors, colors in a customer's proprietary marked patterns, or customer defined colors in the form of an index color table. Spot colors are often used, or can be used, for large background areas, which may be the most color critical portion of a particular page. Consistent color in these areas may determine the difference between success or failure in meeting customer requirements.

A goal of the disclosed system and method is to transform the current production print practice by providing an automated approach to the printing of spot colors. Because imaging can occur over a variety of different printing systems and practiced by a variety of different clients and customers, the colors may not always be consistent or accurate. Existing spot color editors utilize a manual approach to the adjustment of CMYK recipes of spot colors prior to raster image processing (RIPing). For example, the document creator may select a Pantone color for application in specific areas through a user interface on a printing device or computer monitor, such as that available on the Xerox® DocuSP® Controller. The Pantone-provided CMYK recipe for the selected printer is obtained from a look-up table. Prior to RIPing the document in the printer, the operator has the option of entering a spot color editor function and specifying an alternative CMYK recipe to achieve the desired color. The document is then RIPed and then printed using the spot color editor recipes where specified, and Pantone recipes otherwise.

Notably, the algorithms used in such prior art devices require the use of a pre-calculated single gain matrix per spot color as inputs. Gain matrices are obtained using the printer Jacobian matrix and MIMO pole-placement algorithms. Since these matrices are calculated offline during the printer characterization process, the convergence of spot colors to achieve desired accuracy can vary depending on the machine state. Also, the state feedback design may not perform as well as desired for colors near the boundary and the deltaE2000 convergence criteria cannot be easily defined while selecting proper gain matrices since the prior art design uses the CIELab convergence criteria. The computation of deltaE2000 number provides an improved method for comparing color differences in perceptual space. Therefore, it is highly desired to establish the convergence criteria in such a way that the deltaE2000 value for each color is minimized using the minimum number of algorithm iterations. Consequently, it would be desirable to have an automated system that provides improved color performance through the use of a plurality of gain matrices per spot color in determining spot color coordinates.

INCORPORATION BY REFERENCE

The following U.S. patents and published U.S. patent applications cited herein are fully incorporated by reference. The following patents or publications are noted:

U.S. Patent Application Publication No. 2002/0093684 to Bares et al. ("Accurate Printing of Proprietary Mark Patterns and Colors") describes a printing system that provides a dictionary of recognizable patterns and defined colors corresponding to proprietary marks and selected colors. The dictionary is linked to a user interface on which a user may designate a location within a document and one or more of the proprietary marks with defined colors from an accessible menu. A processor associates the defined colors with the image at the specified location and generates a printer signal representative of the colors and image. Alternatively, the processor may include a pattern recognizer for identifying recognizable patterns within a document. Those patterns having a likeness to defined patterns within the pattern dictionary can be converted to the defined patterns for display or imaging.

U.S. Pat. No. 6,157,469 to Mestha ("Dynamic Device Independent Image Correction Method and Apparatus") describes a method of controlling color drift between a desired image and an output image as obtained by a marking device and intended to match the desired image. The method includes detecting a current output color in the output image with a color sensing device, determining a difference between the current output color in the output image and a corresponding color in the desired image, and automatically setting a next output color in the output image equal to a corrected color that minimizes the difference between the next output color and the corresponding color in the output image.

U.S. Pat. No. 6,178,007 to Harrington ("Method for Continuous Incremental Color Calibration for Color Document Output Terminals") teaches a method for continuously upgrading the color calibration for an electrophotographic printer using a color transform look up table stored in memory. A single or small number of color patch samples is printed at regular intervals during the use of the printing machine. The color patches are sensed and a determination made as to the difference between the sensed color and the desired color. A corrective color calibration value is determined for the sensed patch and a correction is made for that color in the printer memory. The process is repeated to assure that all of the colors within the gamut of the machine are continuously updated.

U.S. Pat. No. 6,744,531 to Mestha et al. ("Color Adjustment Apparatus and Method") teaches an apparatus for providing consistent output across a plurality of different hard copy output devices which may be included in a system having an image data source and a hard copy output device. The image data source supplies image data to a printable image data adjusting apparatus. The image data supplied may be in a device-dependent color space or a device-independent color space. For image data in a device-dependent color space, the adjusting apparatus first converts the image data into device-independent image data and stores it in memory as target image data. If the image data is already device-independent, the image data are stored in the memory of the adjusting apparatus as target image data. The printable image data adjusting apparatus then uses the target image data to generate printable image data. The hard copy output device uses the printable image data to generate a hard copy image. The hard copy image is then passed within the optical field of a sensor that detects device-independent image data values of the hard copy image. The detected device-independent image data values are then compared against the target image data to generate color adjustment factors. The color adjustment factors are used to produce a hard copy image having detected device-independent image data values that more closely represent the target image data.

U.S. Pat. No. 6,809,837 to Mestha et al. ("On-line Model Prediction and Calibration System for a Dynamically Varying Color Reproduction Device") teaches a method and apparatus for on-line prediction of an analytical model of a dynamically varying color reproduction device. The method includes recursively executing a parameter adjustment algorithm for updating the parameters to the analytical model. Parameter adjustment is computed based upon a measured error signal detected between a sensed signal detected from actual device output and with an insitu sensor, and the analytical model output. The adjustment algorithm is recursively executed until parameter convergence effects a minimal error measurement, at which time the updated parameters are identified as accurate within the selected parametric model.

U.S. Pat. No. 7,069,164 to Viturro et al. ("Method for Calibrating a Marking System to Maintain Color Output Consistency Across Multiple Printers") teaches a method for maintaining consistent color output across printers even when the inline sensors have differences in accuracy due to various technical and environmental factors. A spectrophotometer is used to measure the color quality of printed references. Adjustments are then iteratively made until reference charts of desired color quality are obtained. The printed reference allows one to achieve relatively high system performance by removing sensor inaccuracies. Using the printed reference measured by the inline sensor, control systems of each machine are calibrated. At customer sites and at suitable intervals, a reference document can be read using the inline sensor on a reference machine and any differences from expected values can be calibrated out.

U.S. Patent Application Publication No. 2005/0030560 to Maltz et al. ("Methods and Systems for Controlling Out-of-gamut Memory and Index Colors") describes methods and systems in an image processing device for controlling colors that are located external to a gamut. A plurality of color values can be automatically provided as input to said image processing device, wherein the image processing device is under the control of a particular dimensional order, typically a three-dimensional order, but alternatively can be a two-dimensional order. An operation can then be performed dynamically determining which color value among the plurality of color values has attained a gamut limit. Thereafter, the particular dimensional order can be automatically reduced, providing improved control for colors that are located external to the gamut. The plurality of color values analyzed is generally associated with three colors: cyan, magenta, and yellow.

U.S. Patent Application Publication No. 2002/0093684 to Bares et al. ("Accurate Printing of Proprietary Mark Patterns and Colors") describes a printing system that provides a dictionary of recognizable patterns and defined colors corresponding to proprietary marks and selected colors. The dictionary is linked to a user interface on which a user may designate a location within a document and one or more of the proprietary marks with defined colors from an accessible menu. A processor associates the defined colors with the image at the specified location and generates a printer signal representative of the colors and image. Alternatively, the processor may include a pattern recognizer for identifying recognizable patterns within a document. Those patterns having a likeness to defined patterns within the pattern dictionary can be converted to the defined patterns for display or imaging.

Other patents include:

U.S. Pat. No. 6,636,628 to Mestha et al. ("Iteratively clustered interpolation for geometrical interpolation of an irregularly spaced multidimensional color space");

U.S. Pat. No. 7,110,143 to Bares et al. ("Accurate Printing of Proprietary Mark Patterns and Colors");

U.S. Pat. No. 6,344,902 to Duke et al. ("Apparatus and Method for Using Feedback and Feedforward in the Generation of Presentation Images in a Distributed Digital Image Processing System");

U.S. Patent Publication No. 20040141193 to Mestha ("State-Space Based Modeling of Pixel Elements of a Dynamically Varying Color Marking Device");

U.S. Pat. No. 6,222,648 to Wolf et al. ("On Line Compensation for Slow Drift of Color Fidelity in Document Output Terminals (DOT)");

U.S. Pat. No. 6,934,053 to Mestha et al. ("Methods for Producing Device and Illumination Independent Color Reproduction"); and U.S. Pat. No. 5,452,094 to Ebner et al ("Method and Apparatus for Storage and Printing of Logos Using a Storage Medium Capable of Storing Multiple Logos").

BRIEF DESCRIPTION

In accordance with one aspect of this disclosure, a method of mapping spot colors within a printer's gamut is disclosed. The method of mapping comprises (A) generating a first estimated in-gamut printer device dependent color space representation associated with an out-of-gamut target color; (B) printing the first estimated printer device dependent color space representation associated with the target color; (C) generating a first measured spot color representation of the target color by measuring the spectral properties associated with the target color; and (D) executing a gamut mapping control system, wherein the gamut mapping control system generates a first set of two or more estimated in-gamut printer device dependent color space representations associated with the target color, based on two or more respective gain matrices and selects the estimated color space representation nearest to the target color as a second estimated printer device dependent color space representation associated with the target color.

In accordance with another aspect of this disclosure, a gamut mapping control system is disclosed wherein the gamut mapping control system comprises an image rendering device; a spectral measurement device; a gamut mapping controller operatively connected to the image rendering device and spectral measurement device. The gamut mapping controller is configured to map spot colors within the gamut of the image rendering device by executing a gamut mapping process to generate an estimated color space representation of a target color, the gamut mapping process comprising (A) generating a first set of two or more estimate image rendering device dependent color space representations associated with the target color, wherein the set is based on a predictive model associated with the image rendering device and the set of two or more estimated representations of the target color includes image device dependent color space estimations for a range of gamut mapping controller responses based on one or more parameters; and (B) selecting the estimated image rendering device dependent color space representation generated in step (A) which is nearest to the target color.

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

Figure 1:
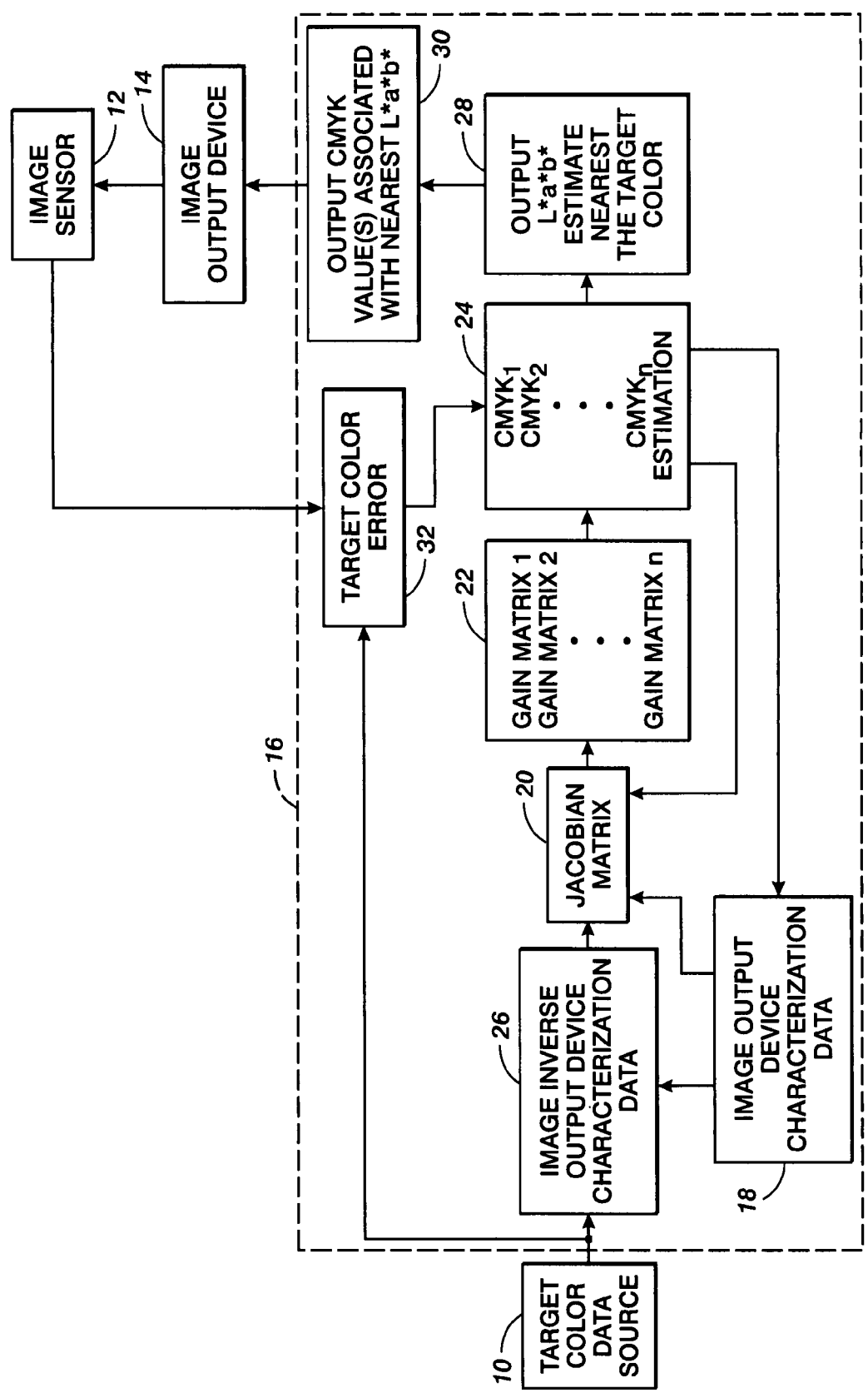
FIG. 1 is a diagram illustrating a spot color control system including a gamut mapping control system according to an exemplary embodiment of this disclosure.

The automated spot color editor disclosed improves upon the existing methods for adjusting or developing image output device dependent color space rendering recipes to achieve consistency and accuracy in the print production of spot colors. The methodology used to design "optimal" controllers for the Automated Spot Color Editor is based on the use of the MIMO Model Predictive Controller (MPC). The implementation of the MPC selects, at each iteration of the spot color editor, a gain matrix which is selected from a set of gain matrices within the iteration, which is calculated by minimizing a predetermined performance function comprising of deltaE2000 color differences between named spot color $L^*a^*b^*$ values to the measured spot color $L^*a^*b^*$ values for a preset planning or a predictive horizon. The best gain matrix is selected out of the minimization procedure, which then becomes the gain matrix actively used during iteration.

The predetermined performance function minimized includes (i) the deltaE2000 color-difference values, (ii) the minimization of control energy of the actuators, or (iii) ascertaining the trade-offs between (i) and (ii) at the same time. While for the purposes of brevity and clarity the following description is directed to a cost function associated with deltaE2000 color-difference values, it is noted that other functions known in the art could also be utilized, for example the CIELab equation, all of which are encompassed within the scope of the disclosure and claims herein. By selecting the optimization criterion in (i), the error between the desired color and the measured color is minimized. When the criterion (ii) is used, the error between the desired color and the measured one is still reduced but at the expense of minimizing the control energy used in all the actuators during iteration. The implementation of (iii) seeks to balance the goals established in (i) and (ii). The minimization of the error between the desired color and the measured one as well as the control energy, using the proper gain matrix (controller) in every iteration, results in an "optimal" controller that aims at rapidly tracking the desired color when compared to prior art methods.

Some features of this approach include (1) Providing the ability to define a better performance (cost) function for minimization. In addition to minimization of deltaE2000 criteria during iteration, the minimization of control energy (i.e., how much of delta CMYK to use during each iteration) may be used in addition to the deltaE2000 criteria.

(2) Providing the ability to set a predictive/planning horizon. In the ASCE algorithm, it is possible to further discretize the computation of gain matrices during each iteration to select the best one suitable for minimizing the performance criteria during the iteration.

(3) Providing the ability to compute the printer Jacobian and hence the gain matrices online, which makes the system more adaptive.

(4) Trade offs between control energy and deltaE2000 criteria can be easily obtained by adjusting weighting factors. This is particularly useful for control of in-gamut spot colors to on-gamut boundary spot colors, since on-gamut boundary spot colors can be set to use minimal control energy without leading to instabilities.

Figure 9:
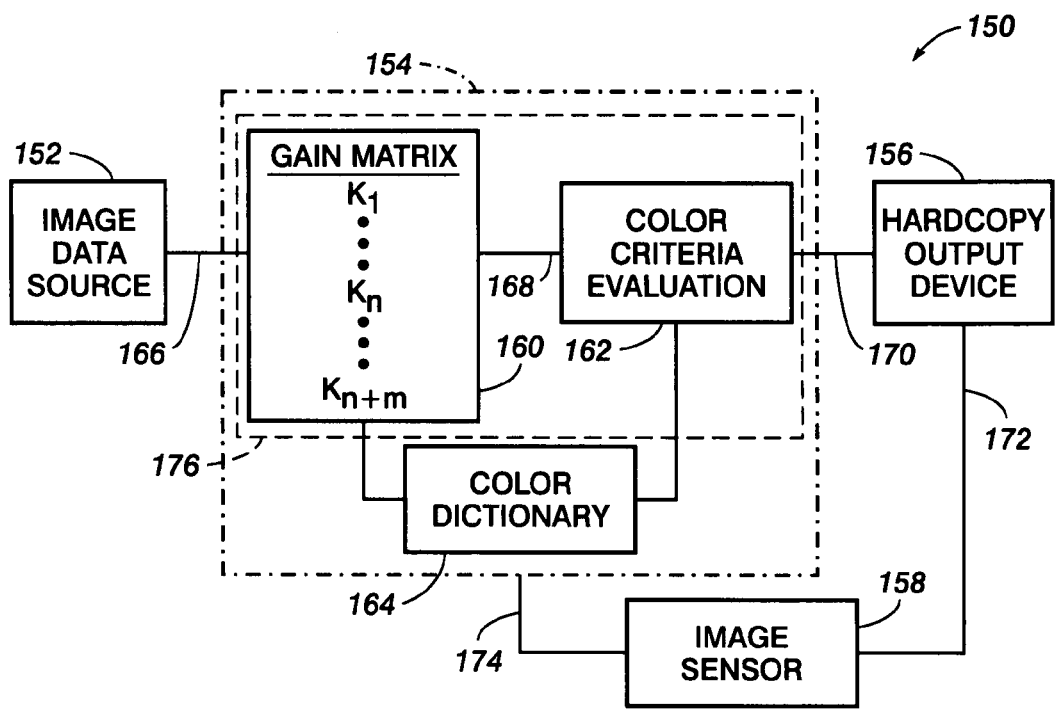
FIG. 9 is a diagram illustrating the structure and functions performed by an example embodiment of a marking device utilizing the model predictive controller within an automated spot color editor.

Referring to FIG. 9, there is depicted a functional block diagram of one exemplary embodiment of a print color adjustment system in accordance with the automated spot color editor disclosed herein. It is to be understood that certain aspects of the system would operate in accordance with pre-programmed instructions used to operate a local or networked computer system to carry out such features—perhaps on a plurality of interconnected computers at a time. Such a system might include a commercially available personal computer with appropriate graphics rendering capability that can also be associated with a networked storage medium or similar memory device wherein the system is accessible, perhaps via an Internet or intranet for submission of print jobs. It is also contemplated that one or more aspects of the system may be implemented on a dedicated computer workstation.

As shown in FIG. 9, the color adjustment system 150 is connected to an image data source 152, an Automated Spot Color Adjustment Editor (ASCE) 154, a hard copy output device 156, and an image sensor 158. ASCE 154 includes color dictionary 164 and MIMO Model Predictive Controller (MPC) 176, having gain matrix module 160, and color criteria evaluation module 162. These devices are coupled together via data communication links 166, 168, 170, 172, and 174. These links may be any type of link that permits the transmission of data, such as direct serial connections, a local area network (LAN), wide area network (WAN), wireless network, an intranet, the Internet, circuit wirings, and the like.

The content for a printing job is initially provided by the customer through an image data source 152 in a form acceptable to the system. The image data source may be a personal computer, a microprocessor, a scanner, a disk drive, a tape drive, a hard disk, zip drive, CD-ROM drive, a DVD drive, a network server, a print server, a copying device, or any other known or later developed device or system that is able to provide the image data. Image data source 152 may include a plurality of components including displays, user interfaces, memory, disk drives, and the like. For simplicity of the following disclosure, it will be assumed that the image data source is a personal computer although, as indicated above, the image data source is not limited to a personal computer.

Hard copy output device 156 may be any type of device that is capable of outputting a hard copy of an image and may take the form of a laser printer, a bubble jet printer, an ink jet printer, a copying machine, or any other known or later developed device or system that is able to generate an image on a recording medium using the image data or data generated from the image data. The hard copy output device 156 generates the hard copy of the image based on printable image data generated by the ASCE.

Image sensor 158 may be any type of device that is capable of detecting image data from a hard copy image and supplying the image data as detected device-independent image data or device dependent image data or post-processed image data, which may be in device-independent or in device-dependent form to the ASCE 154. For example, the image sensor may be an optical sensor, a spectrophotometer, a color sensor, an inline sensor, an off-line sensor, or any other known or later developed device or system that is able to measure the color values of the image data from the hard copy image output by the hard copy output device 156.

Although for the purposes of description ASCE 154 is shown as a separate device from the image data source 152, the ASCE 154 may be an integrated device, such as a digital copier, a computer with a built-in printer, or any other integrated device that is capable of producing a hard copy image output. With such a configuration, for example, the image data source 152, the ASCE 154, the hard copy output device 156, and the sensor 158 may be contained within a single device.

Alternatively, the ASCE 154 may be a separate device containing the ASCE 154 and the sensor 158 attachable downstream of a stand-alone hard copy output device 156. For example, the ASCE 154 and the sensor 158 may be a device which interfaces with both the image data source 152 and one or more hard copy output devices 156, as would be the case if the ASCE 154 is incorporated into a network print server that manages printer data for a plurality of the same or different printing devices.

Furthermore, the ASCE 154 may be implemented as software on the image data source 152 or the hard copy output device 156. The image sensor 158 may be incorporated into the hard copy output device 156 or may exist as a standalone device that communicates the detected data back to the image data source 152. Other configurations of the elements shown in FIG. 9 may be utilized without departing from the spirit and scope of the specification and claims herein.

The term "image", as used in this disclosure refers to a graphic or plurality of graphics, compilation of text, a contone or halftone pictorial image, or any combination or subcombination thereof, that is capable of being output on a display device, a marker and the like, including a digital representation of such image. For example, an image may be a combination of graphics, text and pictures that is represented by a series of pixel values denoting the color, intensity, etc., of the particular pixels that make up the image. A special subclass of images is images associated with complete documents, which are hereinafter referred to as "document images". Thus an image may be a document image assembled by a customer at the image data source 152, one or more elements of a document image, a "test patch" generated by printing application software or another type of control system, or a member of a collection of images in a database. Image data source 152 provides image data that, when used to display the image or convert the image into a hard copy, provides an approximate representation of the image. The image data source 152 provides the image data to the ASCE 154.

The image data input to the ASCE 154 may be in either a device-dependent color space or a device-independent color space. For example, if the image data source 152 is a personal computer, the image data used for representing the image is typically in the RGB color space, since this is the color space used by a display of the image data source 152. These RGB values may be directly forwarded to the ASCE 154 or may undergo conversion into a device-independent color space, such as L*a*b*, (the Commission Internationale de L'éclairage color standard) prior to being input to the ASCE 154. L* defines lightness, a* corresponds to the red/green value, and b* denotes the amount of yellow/blue, which corresponds to the way the human eye perceives color. A neutral color is a color for which a*=b*=0.

If the conversion of the device-dependent color space values into device-independent color space values is not performed by the image data source 152 when inputting the image data to ASCE 154, then the ASCE 154 may perform the conversion between the color spaces.

The ASCE 154 transforms the device-independent image data into printable image data based on the color space used by the hard copy output device 156. For example, if the hard copy output device 156 is a printer, the color space used by the printer will often be the CMYK color space. In such a case, the ASCE 154 converts the device-independent image data into CMYK-color space printable image data for the appropriate target value. Alternatively, the target values may be described in any of the color spaces, such as reflectance spectra, L*a*b*, CMYK, RGB, parameters describing color, sRGB, or even the color number, such as a Pantone® number.

Because of various factors, such as environmental conditions, use patterns, the type of media used, variations in media, variations from original models used in initializing the hard copy output device, general wear, and the like, the colors capable of being output by the hard copy output device 156 may not match the desired colors represented by the device-independent image data.

In the ASCE, when a hard copy of the image is output by the hard copy output device 156, the hard copy is placed within the field of detection of the image sensor 158. Image sensor 158 generates image data from the hard copy image and transmits this image data in any of the device independent color coordinate spaces (reflectance spectra, L*a*b*, XYZ, LHC) or in device dependent spaces (CMY, CMYKL, RGB, sRGB) depending on the direct output or transformed output of the sensor image data to the ASCE 154.

Within the ASCE 154, the model predictive controller 176 compares the detected image data values with target image data stored in color dictionary 164. Based on the comparison, adjustment factors are determined that adjust the printable image data to create a revised color recipe for the target value such that the resulting image output by the hard copy output device 156 results in detected image data values that more closely correspond to the target image data. The implementation of the MPC 176 selects, at each iteration of the spot color editor, a gain matrix which is selected from a set of gain matrices 160 within the iteration. The selection is determined by color criteria evaluation module 162, which minimizes a predetermined performance function comparing the deltaE2000 color differences between named spot color L*a*b* values to the measured spot color L*a*b* values for a preset planning or a predictive horizon. The best gain matrix is selected out of the minimization procedure which then becomes the gain matrix actively used during iteration. Operation of the MPC is discussed in more detail with reference to FIGS. 10-12 herein. Alternatively, the ASCE may be utilized to develop new spot colors to meet customer demands and these new spot color recipes are stored in memory.

This process may be repeated a number of times until an amount of error between the detected image data and the target image data falls within an acceptable tolerance. The process may also be restricted to a preset number of iterations. Once the detected image data is within the given tolerances, and/or the maximum number of iterations have been performed, the ASCE 154 provides the hard copy output device 156 with the final set of printable image data usable to output the final image. In this way, the final image will more closely resemble the desired output image regardless of the particular hard copy output device that produces the final image. Thus, if the same image is to be printed by a plurality of different hard copy output devices having different attributes or different printer drifts, substantially the same final image will be produced by each hard copy output device regardless of the different attributes and drifts of each printing device.

The particular methods performed by the ASCE comprise steps which are described below with reference to a series of flow charts. The flow charts illustrate an embodiment in which the methods constitute computer programs made up of computer-executable instructions. Describing the methods by reference to a flowchart enables one skilled in the art to develop software programs including such instructions to carry out the methods on computing systems. The language used to write such programs can be procedural, such as Fortran, or object based, such as C++. One skilled in the art will realize that variations or combinations of these steps can be made without departing from the scope of the disclosure herein.

Figure 10:
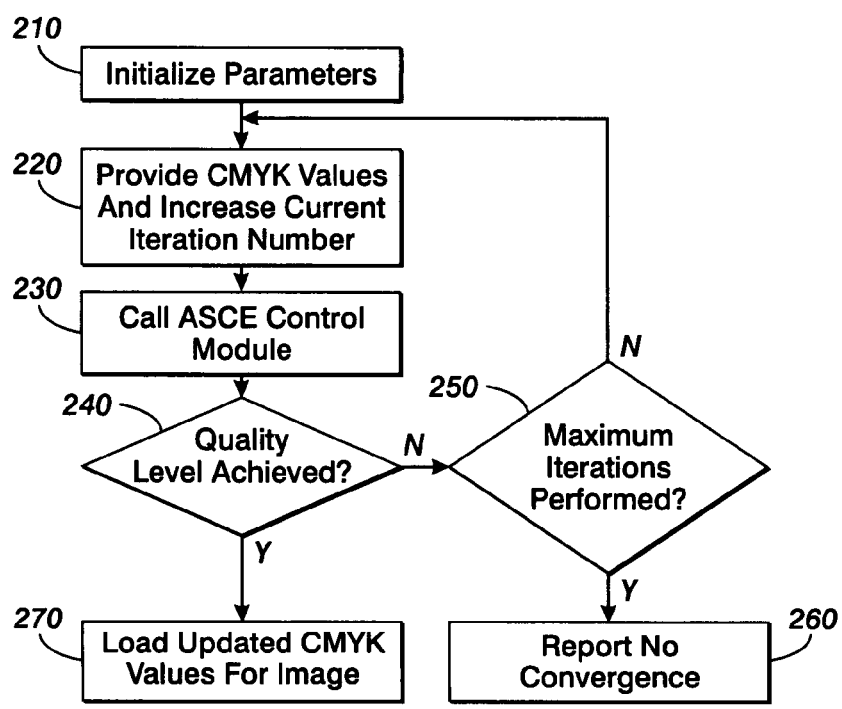
FIG. 10 is a flow chart outlining one exemplary embodiment of the method of operation of the automated spot color editor.

Turning now to FIG. 10, a flowchart illustrates an exemplary embodiment of the method of operation of the automated spot color editor (ASCE). The system begins operation of the ASCE application at 210, with initialization of parameters. The initialized parameters include the current iteration of the ASCE (inum), the desired deltaE2000 (δEtol), and the maximum number of iterations (Iter), of the algorithm. The ASCE module checks the list of spot colors present in the submitted image file against the current printer spot color dictionary. If there are any spot colors on the list that are not included in the printer spot color dictionary, new entries are created in the printer spot color dictionary. This is described more fully in copending application U.S. patent application No. 20051324-US-NP, U.S. application Ser. No. 11/507,405, filed Aug. 21, 2006, titled "System and Method for Automated Spot Color Editor," fully incorporated by reference hereinabove.

The alternate color space (e.g., reflectance spectra, L*a*b*, RGB, sRGB, parameters describing color or even the color number) of each spot color is used to generate each initial CMYK value. If the alternate color space of a spot color is RGB, L*a*b* color space, the default destination profile for the default halftone is used to create the initial CMYK value for the spot color. If the alternate color space is untagged CMYK, then this CMYK value is used. For the purposes herein, tagging is a method by which CMYK values are organized with some marks so that they can be browsed or processed differently for RIP'ing. Tagging assists in locating the right CMYK for a particular color. The initial CMYK (iCMYK), the iteration number (inum), and the current updated CMYK values (uCMYK), are provided to the ASCE application from the printer graphical user interface at 220.

The ASCE control algorithm is called at 230 and performs a first iteration to generate a printable document of patches using the list of spot colors to be updated. To activate the ASCE function at 230, a software button on the user interface is utilized. The CMYK values for each spot color are obtained at 220 from the printer spot color dictionary and the current iteration number is increased. The spot color patch document is RIP'ed by the printer using no color management for CMYK objects and the default halftone and is printed on the print engine. The spot color document is then read through use of an inline sensor or a spectral sensor and the resulting L*a*b* data is sent to the ASCE module. A determination is made as to whether this is the first iteration of the ASCE module. If this is the first iteration, the ASCE checks for L*a*b* reference values for each spot color on the list. If a reference value exists, it is loaded into the ASCE module. It is then determined if there is a reference L*a*b* for each spot color. If so, the ASCE module checks the measured L*a*b* against the reference L*a*b* for each spot color on the list. If a reference L*a*b* does not exist, the measured L*a*b* is written into the ASCE spot color list as the new reference L*a*b* and a signal is sent to "release" the image file to be RIP'ed and printed at 270. If this is not the first iteration of ASCE, for each spot color the measured L*a*b* is checked against the reference L*a*b*.

The color criterion for the current quality level is checked at 240. If the color criteria (for example dE2000) is met for the quality level selected, then the color is ready to be printed at 270. Otherwise, the module continues iterating 250 if the current iteration is less than the maximum number of iterations (Iter) specified at 210. If the quality level for the desired color is not met with the number of iterations being greater than Iter, then the algorithm fails to generate the desired color. The ASCE module is exited and at 260 a message is presented to the operator on the graphical user interface listing the spot colors that failed the quality level specified by the operator and that the printer spot color dictionary has been updated with the closest match possible for each color.

If the maximum number of iterations has not been exceeded, the ASCE algorithm continues to update the CMYK values for the spot color and the updated CMYK values are written into the printer spot color dictionary. An additional iteration of the ASCE module generates a printable document of patches using the list of spot colors that were just updated and the CMYK values for each spot color as listed in the printer spot color dictionary. As described above, the spot color document is then read through use of an inline sensor or a spectral sensor and the resulting L*a*b* data is sent to the ASCE module. The sequence of checking the measured L\*a\*b\* value against the reference L\*a\*b\* value, assessing whether the quality level was achieved and performing additional iterations is continued until either the color quality criteria has been achieved or the maximum number of iterations has been reached.

Figure 11:
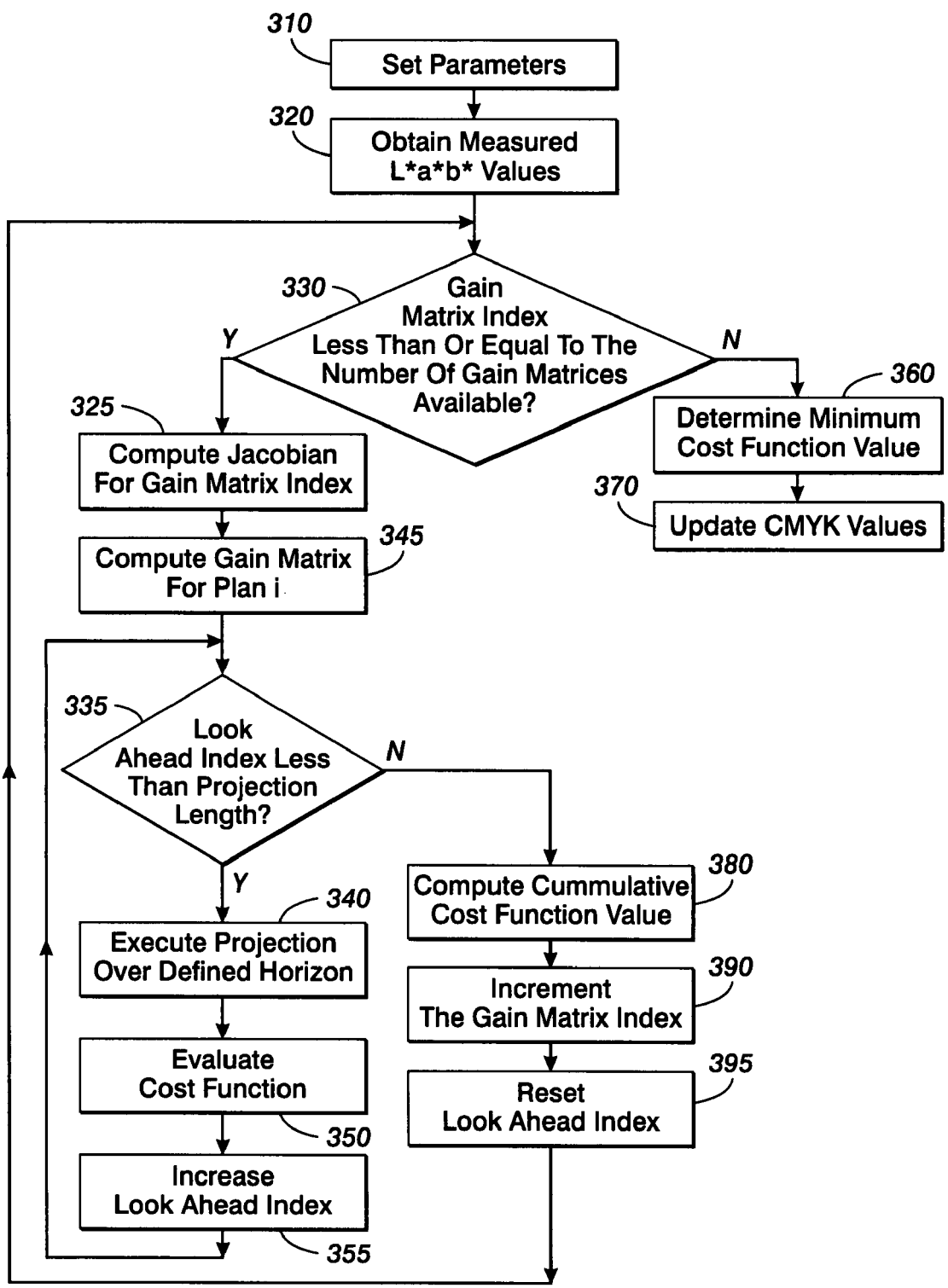
FIG. 11, a more general version of FIG. 3, is a flow chart outlining one exemplary embodiment of the operation of the model predictive controller over one color within the automated spot color editor.

Referring now to FIG. 11, the operation of the model predictive controller (MPC) within the automated spot color editor is illustrated where is shown the process flow for updating the CMYK values of one color. If a set of spot colors is to be considered, then this process must be applied consecutively to each color in the set. The model predictive controller chooses the best gain matrix during each call to the ASCE. All of the parameters to be used during the implementation are set at 310. These include delta CMYK values, $\delta_a$, $a \in \{1, \ldots m\}$, and poles location, $p_b$, $b \in \{1, \ldots n\}$, which are used for the calculation of the gain matrix from the printer Jacobian. The projection length, or prediction/planning horizon (the number of iterations planned at a time), N, of the MPC, and the weight parameters, $w_1$ & $w_2$, for the cost function are entered as additional initialization parameters. The measured L\*a\*b\* values are obtained from an inline or offline spectrophotometer by printing a spot color and measuring with the instrument. Also entered is the number of plans or gain matrices available, Np. The first L\*a\*b\* measured values for the spot color before executing any iteration are obtained at 320. Other parameters are internal to the ASCE algorithm.

For each iteration, a determination is made at 330 as to whether the current gain matrix index is less than or equal to the number of gain matrices available. If so, the printer Jacobian is computed online at 325 using a stored printer model. Pole locations are assigned during iteration. The gain matrix Ki(k) is computed for each plan i at 345 using the printer's Jacobian and pole locations. It is noted that, for the purposes of this discussion, the multiple gain matrices are determined via MIMO state-feedback controller design. However, any other method known in the art that generates gain matrices for MIMO systems could also be applied in this context, all of which are included within the scope of the disclosure and claims herein. Therefore, the application of MIMO MPC is not limited to the approach presented here. It is noted that when gain matrices are computed "off-line" steps 325 and 345 are not required for the run-time mode. It is then determined whether the look ahead index, the number of iterations planned at a time, is less than the projection length at 335. If the look ahead index is greater than or equal to the projection length, the cumulative cost function value is computed at 380 and the gain matrix index is incremented at 390. The look ahead index is then reset at 395.

If the look ahead index is less than the projection length, the projection is executed over the defined horizon at 340. The projection of the CMYK values is executed for each plan i and the cost function is evaluated at 350 for each plan i. To evaluate the performance of each plan i, the cumulative cost function is defined as $$J(u^i[k,N]) = w_1 \sum_{j=0}^{N-1}(E^i(k+j))^2 + w_2 \sum_{j=0}^{N-1}\|u^i(k,j)\|^2$$

where $E^i(k+j)$=deltaE2000($L_{r,k+j}^*, a_{r,k+j}^*, b_{r,k+j}^*, y_m^i(k+j)$), with deltaE2000 being the color-difference formula defined by CIE, and $u^i(k,j) = K^i(k) * ([L_{r,k+j}^* a_{r,k+j}^* b_{r,k+j}^*] - y_m^i(k+j))$. $\|a\|$ is the 2-norm of vector a. The tracking error is defined as $e(k+j) = ([L_{r,k+j}^* a_{r,k+j}^* b_{r,k+j}^*] - y(k+j))$. It is assumed that $[L_{r,k+j}^* a_{r,k+j}^* b_{r,k+j}^*] = [L_r^* a_r^* b_r^*]$ for a given spot color and for all k,j, which is the case for the ASCE spot colors.

The sequence of control inputs of the $i^{th}$ plan of length N are denoted as $u^i[k,N] = u^i(k,0), u^i(k,1), u^i(k,2), \ldots, u^i(k,N-1)$. Each plan i is formed by a set of control inputs generated by a state-feedback controller computed for a specific pair conformed by the printer Jacobian and the pole locations. The variables $w_1$ and $w_2$ are positive constants that scale both the color-difference formula and the control energy so that those constants could be used to put more emphasis on (i) the color difference, (ii) the control energy of the actuators used to track the color difference, or (iii) achieving a balance between (i) and (ii). The look ahead index is then increased at 355.

If the gain matrix index is not less than or equal to the number of gain matrices available, the minimum cumulative cost function value is determined at 360. Ties are resolved randomly. Finally, the control input is used at 370 to compute the new CMYK values.

The above procedure describes the "on-line (or runtime)" implementation of the MPC method when arbitrary spot color consistency is desired. However, an "off-line" version of this method may also be implemented by pre-computing each gain matrix $K^i$ when fixed known spot color consistency is desired. Notice, however, that both algorithms are applied in real-time. The "off-line" approach might be useful when the mapping CMYK→L\*a\*b\* is linear. If this is not the case, then it is better to compute $K^i$ "on-line." By using the latter approach the CMYK→L\*a\*b\* map for each CMYK value is locally linearized, thus changing the printer Jacobian. This, in turn, could produce a change in the gain matrix $K^i$. However, the delta CMYK and poles location values are not being changed.

Figure 12:
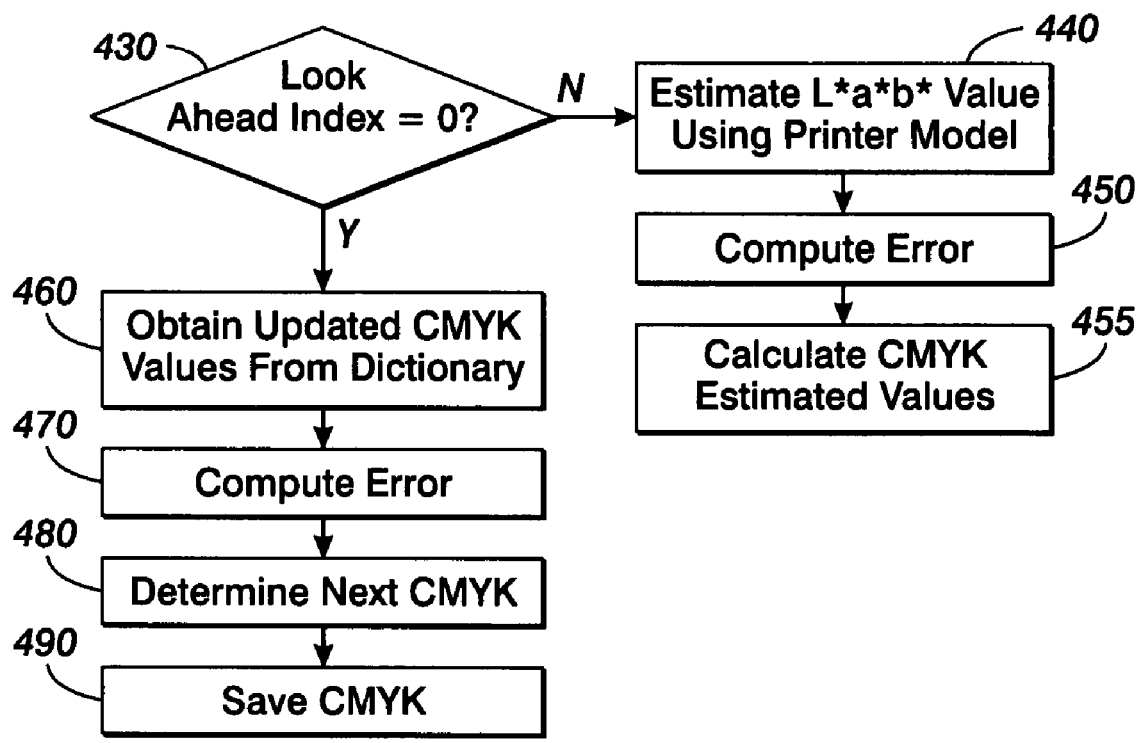
FIG. 12, a more general version of FIG. 4, is a flow chart outlining one exemplary embodiment of estimation of the CMYK values using a planning horizon for the model predictive controllers.

Turning now to FIG. 12, execution of the projection is described in more detail. After computation of the printer Jacobian and the gain matrix as described at 325 and 345 above, a determination is made at 430 as to whether the look ahead index j equals 0. If the look ahead index does not equal 0, the L\*a\*b\* values for CMYK are estimated using a printer model 440, which is a numerical model derived a priori which maps given CMYK values into L\*a\*b\* values to estimate the L\*a\*b\* values (outputs) associated with given CMYK values (inputs). The error between the target L\*a\*b\* and the printer model is calculated at 450. New calculated CMYK values are then developed at 455 using $$x_m^i(k,j+1) = I \cdot x_m^i(k,j) + K^i(k) e^i(k,j)$$

where $x_m^i(k,j)$ is the $j^{th}$ estimated state values of plan i at time k, $I \in \Re^4$ is the identity matrix, $K^i(k)$ is the $i^{th}$ gain matrix used for the entire current projection, and $e^i(k,j)$ is the $j^{th}$ estimated tracking error of plan i at time k. It is to be noted here that $x_m^i(k,j)$, are the CMYK estimated values. The estimated values are then saved in memory for further use in the next projections.

If the look ahead index j does equal 0, the updated CMYK values are obtained from the spot color dictionary at 460. The error between the target L\*a\*b\* value and the measured L\*a\*b\* value is computed at 470. The next CMYK values are then computed at 480 using $$x_m^i(k,1) = I \cdot x_m^i(k,0) + K^i(k) e^i(k,0)$$

The new CMYK values are then saved in memory for further use in the next projections at 490.

To select the best plan, we compute $$i^* = \underset{i}{\operatorname{argmin}} J(u^i[k, N])$$

at each time k. Then, the control input u(k)=u^i*(k,0) is applied to the system (i.e., the first input from the "best" control input).

According to another aspect of this disclosure and described below, provided is a system and method of dynamic gamut mapping of spot colors to maximize printer color reproductibility. The method and system is an extension of the model predictive controller described heretofore, which includes a plurality of gain matrices to calculate an image device dependent color space values associated with a target/spot color.

By way of background related to gamut mapping, conventional gamut mapping of out-of-gamut colors is performed by finding the nearest reproducible color. This process requiring the use of image output device, i.e. printer, characterization gamut data, where the gamut mapping is normally done once during the initial device characterization process. The gamut mapping data remains static throughout the life of the printer or until the characterization process is performed again.

The printer characterization data defines the gamut boundary of the image output device to which the out-of-gamut colors are mapped. In many cases, the actual gamut boundaries of the image output device shift by as much as deltaE2000-4. This boundary shift may result in a significant shift in the color output of the device and is particularly noticeable when characterization of one image output device (i.e. printer) is used for mapping the colors of a second image out device.

The system and method described below provides a dynamic gamut mapping of target/spot colors to adjust the gamut mapping of an image output device according to any gamut boundary shifts that have occurred. The detailed description which follows is directed to a printer or printing system, however, this disclosure and claims which follow are not limited to a printer. Other image output devices appropriate for gamut mapping include displays, plotters, and other image out devices including gamut boundaries.

As briefly discussed above, this disclosure, as described below and with reference to FIGS. 1-8, provides a system and method to dynamically map out-of-gamut spot colors without the need to recharacterize a printer or other image output device. The gamut mapping process utilizes an interactive method by extending the use of a model predictive control algorithm, as previously described above with reference to FIGS. 9-12, which uses an in-line/off-line spectral sensor. Notably, the gamut mapping system and method disclosed may be incorporated into a controller which performs automated spot color editing functions. In addition, a Graphical User Interface (GUI) may be used to initiate, control and monitor the gamut mapping process.

With regard to printing systems, users desire to produce many rich chromatic spot colors which may be out of the printer's gamut. Conventional printer gamut mapping algorithms map the out-of-gamut spot colors to the nearest surface of the printer's characterization gamut, referred to here as a minimum deltaE2000 strategy. The characterization data remains static throughout at life of the printer.

To dynamically map the out-of-gamut spot colors, the gamut mapping system and method disclosed, uses optimization control methods to dynamically map out-of-gamut spot colors to the surface of the printer's gamut. The dynamic mapping process includes one or more iterations of an algorithm which map the out-of-gamut colors to the current locations of the printer's gamut. The target L*a*b* values of the spot colors can be supplied by Pantone or other means associated with a user's specific requirements. These target $L_t^*a_t^*b_t^*L_t^*a_t^*b_t^*$ values become referenced values for the optimal control algorithm which automatically converges to the surface of the printer's gamut during an iteration process designed to satisfy a minimization cost function, e.g. deltaE2000.

According to one exemplary aspect of the disclosed gamut mapping system and method, the following methodology is performed.

1. For color critical users, a GUI operatively connected to the printing system controller provides a user with the ability to select and execute dynamic gamut mapping.

2. Define the maximum number of iterations to be used by the control algorithm, Nmax. Set the current iteration, it=0. Read the target L*a*b* values, $L_t^*a_t^*b_t^*L_t^*a_t^*b_t^*$, of the spot colors. Estimate the CMYK values that should be used to match the desired colors using the characterization of the fleet machine.

3. Print and measure, $L_m^*a_m^*b_m^*L_m^*a_m^*b_m^*$, the spot colors with an offline or inline sensor.

4. Run the optimal control algorithm along with the ASCE control algorithm with the desired cost function, J, to be minimized. There are two candidate functions available for this purpose: (1) the cost function is defined as J=deltaE2000 ($L_t^*a_t^*b_t^*$, $L_m^*a_m^*b_m^*L_t^*a_t^*b_t^*$, $L_m^*a_m^*b_m^*$), and (2) the cost function is defined as a combination of (1) plus a planning strategy i (e.g., a set of plans can be having different gain matrices for the controller to be implemented)

$$J(u^i[it, N]) = \sum_{j=0}^{N-1} deltaE2000(L_i^* a_i^* b_i^* L_m^* a_m^* b_m^*)(it+j)$$

where u^i[k,N] is the sequence of control inputs of the i^th plan of length N (i.e., how far the controller will look ahead from the current iteration).

5. Increase it (iterations). If it <Nmax, then go to 3. Otherwise, determine, for each color, the iteration where the minimum cost function J value was obtained and use the correspondent $L_m^*a_m^*b_m^*L_m^*a_m^*b_m^*$ as the mapped value.

6. Display the results of the previous mapped target values, the current mapped target values, and the fleet printer characterization gamut for the advanced user.

7. Store $L_m^*a_m^*b_m^*L_m^*a_m^*b_m^*$ for future use as targets to aim for if the customer wishes to reproduce this best spot color.

Notably, the methodology continually uses the initial printer characterization data. However, the actual measurements in step 3 provide the algorithm with the necessary information to determine where the spot colors should be mapped. This approach provides better mapping relative to the performance of a controller updating the printer characterization LUT by making measurements.

With reference to FIG. 1, illustrated is a diagram for a spot color control system including a gamut mapping control system according to an exemplary embodiment of this disclosure.

The spot color control system comprises a target color data source 10, an image sensor 12, an image output device 14, (e.g. printer) and a controller 16. The controller 16 comprises image output device characterization data 18, Jacobian matrix data 20, a plurality of gain matrices 22, CMYK estimate data matrix 24, an inverse printer output data LUT 26, a process to estimate the output L*a*b* nearest the target/spot color 28, a process to output the estimated CMYK value associated with the nearest L*a*b* estimate 30, and a target color error process 32 to determine the error associated with the target spot color relative to the estimated CMYK and/or measured CMYK associated with a printed output.

Figure 2:
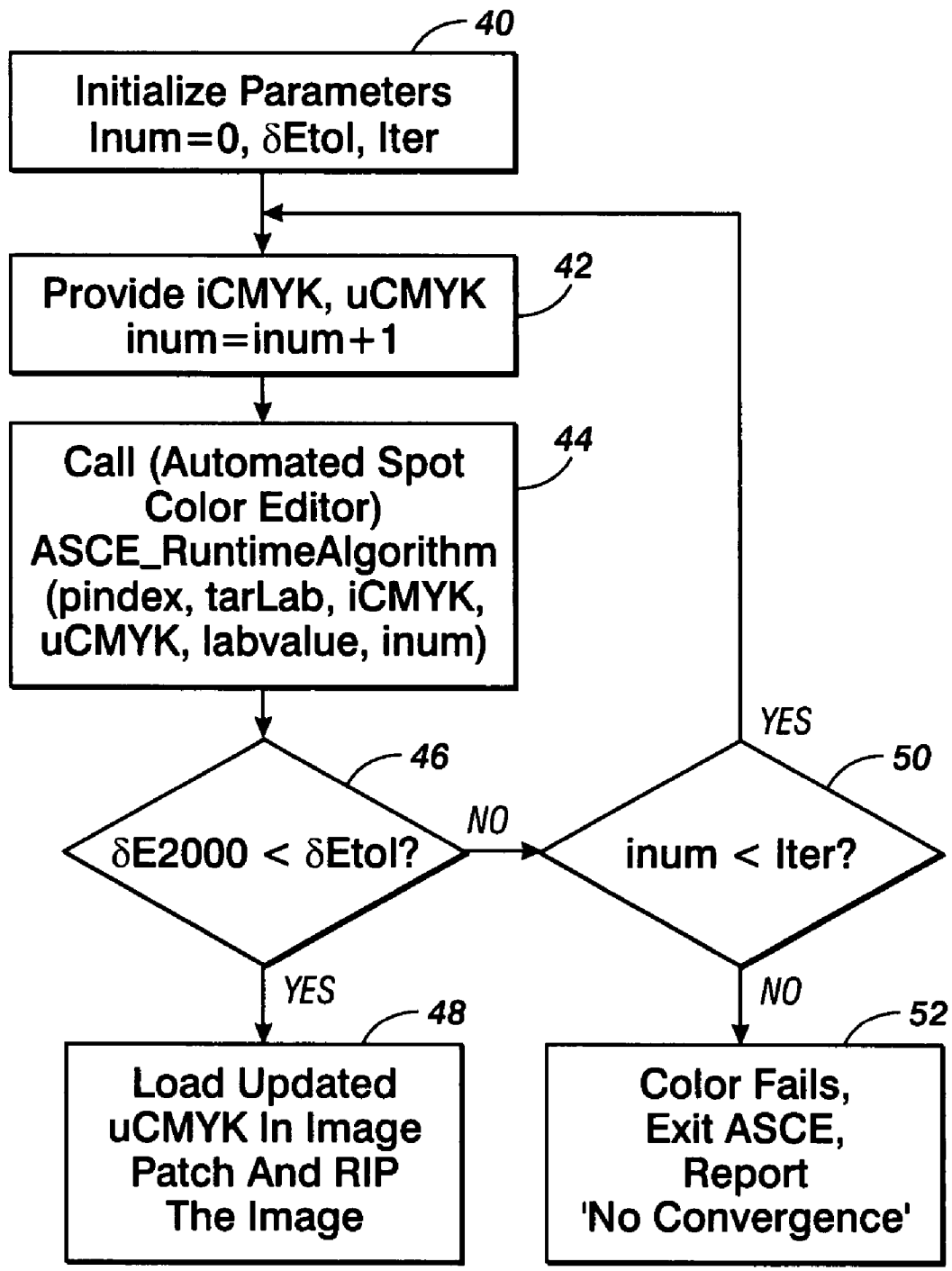
FIG. 2 is a flow chart illustrating a method of operating a spot color control system according to an exemplary embodiment of this disclosure.

With reference to FIG. 2, illustrated is an ASCE flow diagram according to an exemplary embodiment of this disclosure.

In the first block 40, the ASCE application is started. Also, the current iteration of the ASCE, inum, the desired deltaE2000, δEtol, and the maximum number of iterations, Iter, of the algorithm are initialized. The initial CMYK, iCMYK, the iteration number, inum, and the current updated CMYK values, uCMYK, are provided to the ASCE application from the DFE GUI (see second block) 42. Call to the ASCE control algorithm module is shown in the third block 44. The color criterion for the current quality level is checked in the fourth block 46. If this is achieved, then the color is ready to be printed (block 5) 48. Otherwise, the module continues iterating if the current iteration is less than Iter 50. If the quality level for the desired color is not met with the number of iterations being greater then Iter, then the algorithm fails to generate the desired color (block 6) 52. At this point, convergence error is reported to the DFE GUI.

Figure 3:
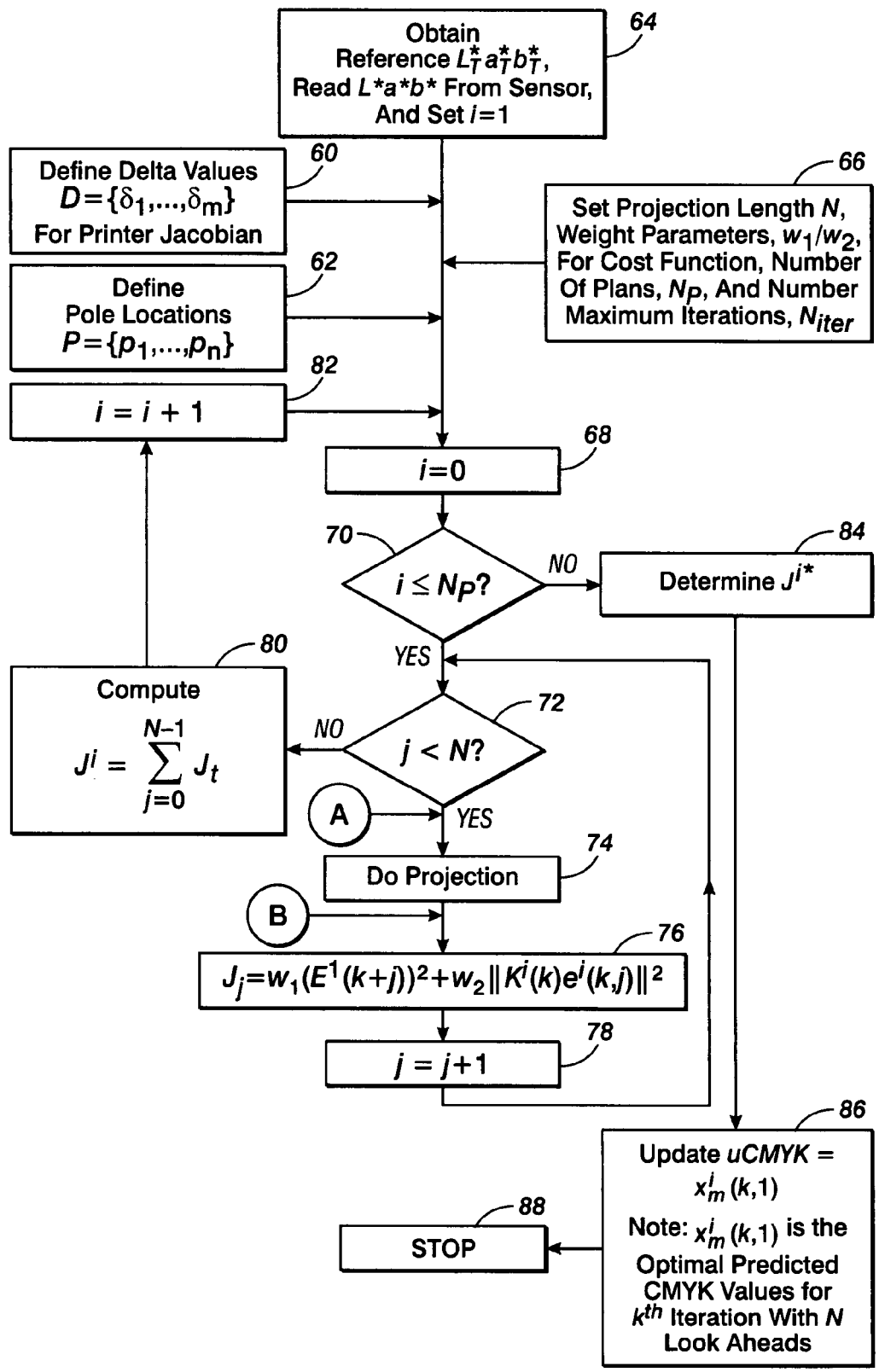
FIG. 3 is a flow chart illustrating a model-predictive control method of operating a spot color control system according to an exemplary embodiment of this disclosure.

With reference to FIG. 3, illustrated is a flow diagram for an "on-line" MPC process according to an exemplary embodiment of this disclosure.

This flow diagram chooses the best gain matrix during each call to the ASCE_RuntimeAlgorithm (block 44 of FIG. 2). The first block in this figure contains the setting of all the parameters to be used during the implementation. It also shows the first L*a*b* measured values for the spot color before executing any iteration 64. Also, delta CMYK values 60 and poles location 62 are entered in the initialization block. They are used for the calculation of the printer Jacobian. The projection length, or prediction/planning horizon, N, of the MPC, and the weight parameters, $w_1$ & $w_2$, for the cost function are entered as additional initialization parameters 66. The measured L*a*b* values are obtained from the inline or offline spectrophotometer by printing a spot color and measuring with the instrument. Other parameters are internal to the ASCE algorithm.

The look ahead index is reset at 68. For each iteration, a determination is made at 70 as to whether the current gain matrix index is less than or equal to the number of gain matrices available. If so, then it is determined whether the look ahead index, the number of iterations planned at a time, is less than the projection length at 72. If the look ahead index is greater than or equal to the projection length, the cumulative cost function value is computed at 80 and the gain matrix index is incremented at 82.

If the look ahead index is less than the projection length, the projection is executed over the defined horizon at 74. The projection of the CMYK values is executed for each plan i and the cost function is evaluated at 76 for each plan. The look ahead index is then increased at 78.

If the gain matrix index is not less than or equal to the number of gain matrices available, the minimum cumulative cost function value is determined at 84. Finally, the control input is used at 86 to compute the new CMYK values and the algorithm stops at 88.

Figure 4:
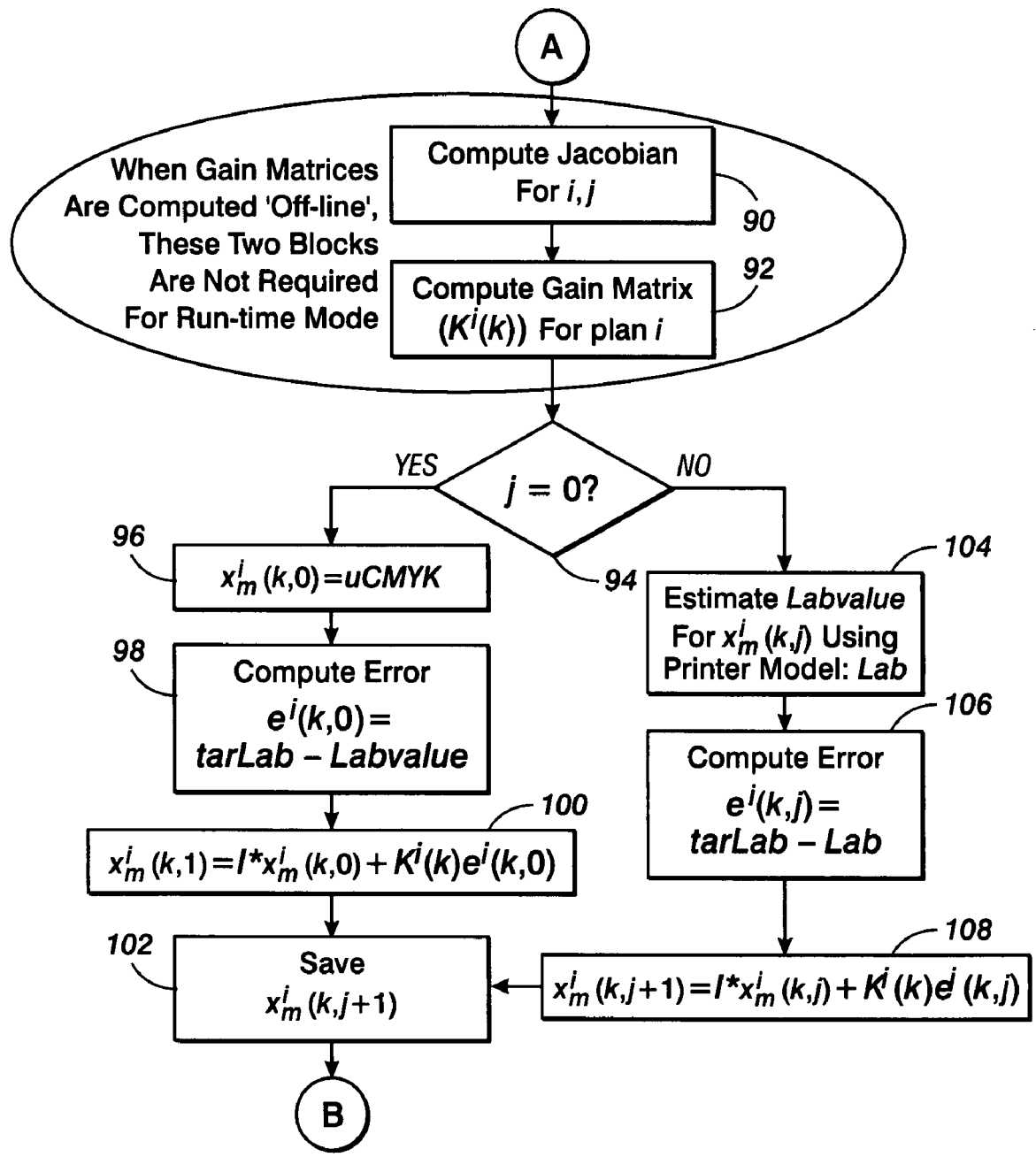
FIG. 4 is a flow chart illustrating a method of estimating a color space representation of a target spot color according to an exemplary embodiment of this disclosure.

FIG. 4 provides more details about the projection block, which basically computes the gain matrix $K^i(k)$ using the printer Jacobian at 90 and pole-placement method (prior art) at 92, for all the combinations between the delta CMYK and pole values. Furthermore, the projection of the CMYK values is executed for each plan i. After computation of the printer Jacobian and the gain matrix, a determination is made at 94 as to whether the look ahead index j equals 0. If the look ahead index does not equal 0, the L*a*b* values for CMYK are estimated using a printer model at 104, which is a numerical model derived a priori which maps given CMYK values into L*a*b* values to estimate the L*a*b* values (outputs) associated with given CMYK values (inputs). The error between the target and the estimated L*a*b* values using the printer model is calculated at 106. New calculated CMYK values are then developed at 108.

If the look ahead index j does equal 0, the updated CMYK values are obtained at 96. The error between the target L*a*b* value and the measured L*a*b* value is computed at 98. The next CMYK values are then computed at 100. The new CMYK values are then saved in memory for further use in the next projections at 102.

Described below is the theoretical framework for the algorithms described with reference to FIGS. 2-4.

Theoretical Framework for MIMO MPC:

Let k denote the time index, called iteration number. Let $y(k+1)=f(x(k),u(k),d(k))=[L_{k+1}^* a_{k+1}^* b_{k+1}^*] \in \Re^3$ be the outputs (L*a*b* measurements at iteration k+1) obtained by a sensor, where f is a smooth function of the states $x(k) \in \Re^4$ (i.e., any combination of colors taken from CMYK), u(k) is the control input, and d(k) is a white-noise signal. Let $r(k) \in \Re^3$ be the reference $[L_{r,k}^* a_{r,k}^* b_{r,k}^*]$ values at step k.

We define the tracking error as $e(k+j)=([L_{r,k+j}^* a^* r_{,k+j} b^* r_{,k+j}]-y(k+j))$. We assume that as $e(k+j)=([L_{r,k+j}^* a_{r,k+j}^* b_{r,k+j}^*]-y(k+j))$ for a given spot color and for all k, j, which is the case for the ASCE spot colors.

Our goal is to develop a planning strategy that generates a sequence of control inputs which minimize e(k) for all k. Denote $u^i[k,N]=u^i(k,0), u^i(k,1), u^i(k,2), \ldots, u^i(k,N-1)$ as the sequence of control inputs of the $i^{th}$ plan of length N. Each plan i is formed by a set of control inputs generated by a state-feedback controller computed for a specific pair conformed by the printer Jacobian and the pole locations. Printer Jacobian is computed online using stored printer model. Pole locations are assigned during iteration.

We use the discrete model $y_m(j+1)=f_m(x_m(j),u(j))$ for $j=0, 1, \ldots, N-1$ (j is the estimation iteration index for plan i) in our simulations and let $y_m^i(k,j)$ be the $j^{th}$ estimated output value generated at time k using the control input $u^i[k,N]$. To see how the control input $u^i[k,N]$ of plan i affects our system, we project the behavior of the system output at time k for $j=0, 1, \ldots, N-1$, that is, $$y_m^i(k,j+1)=f_m(x_m(k,j),u^i(k,j))$$

as well as the system states $$x_m^i(k,j+1)=I^* x_m^i(k,j)+K^i(k)e^i(k,j) \quad (1)$$

where $x_m^i(k,j)$ is the $j^{th}$ estimated state values of plan i at time k, $I \in \Re^4$ is the identity matrix, $K^i(k)$ is the $i^{th}$ gain matrix used for the entire current projection, and $e^i(k,j)$ is the $j^{th}$ estimated tracking error of plan i at time k. It is to be noted here that $x_m^i(k,j)$, are the CMYK estimated values whereas $y_m^i(k,j)$ are the estimated L*a*b* values from the model.

To evaluate the performance of each plan i, we define the cost function as $$J(u^i[k, N]) = w_1 \sum_{j=0}^{N-1} (E^i(k+j))^2 + w_2 \sum_{j=0}^{N-1} \|u^i(k,j)\|^2 \quad (2)$$

where $E^i(k+j)$=deltaE2000($L_{r,k+j}*a_{r,k+j}*b_{r,k+j}*,y_m^i(k+j)$) (deltaE2000 is the color-difference formula defined by CIE), $u^i(k,j)=K^i(k)*([L_{r,k+j}*a_{r,k+j}*b_{r,k+j}*]-y_m^i(k+j))$ and $\|a\|$ is the 2-norm of vector a. The variables $w_1$ and $w_2$ are positive constants that scale both the color-difference formula and the control energy so that those constants could be used to put more emphasis on (i) the color difference, (ii) the control energy of the actuators used to track the color difference, or (iii) achieving a balance between (i) and (ii).

To select the best plan, we compute $$i^* = \operatorname*{argmin}_i J(u^i[k, N]) \quad (3)$$

at each time k. Then, the control input $u(k)=u^{i*}(k,0)$ is applied to the system (i.e., the first input from the "best" control input).

Simulation using Printer Model

In this section of the disclosure, presented is a study for a total of 542 spot colors. For this study, 62 out of 542 colors were inside the printer gamut called "Old Gamut" whereas the rest of the colors, 480, were outside the gamut. Next we do a gamut mapping of the out-of-gamut colors based on the minimization of the deltaE2000 criteria between the original $L_t*a_t*b_t*$ target values and any colors located on the gamut surface.

To simulate the second gamut (represents drift or shift) we created a new gamut with new magenta toner, called "New Gamut", which causes a shift in the printer's "Old Gamut." This variation results in having all 542 colors outside the "New Gamut."

Figure 5A:
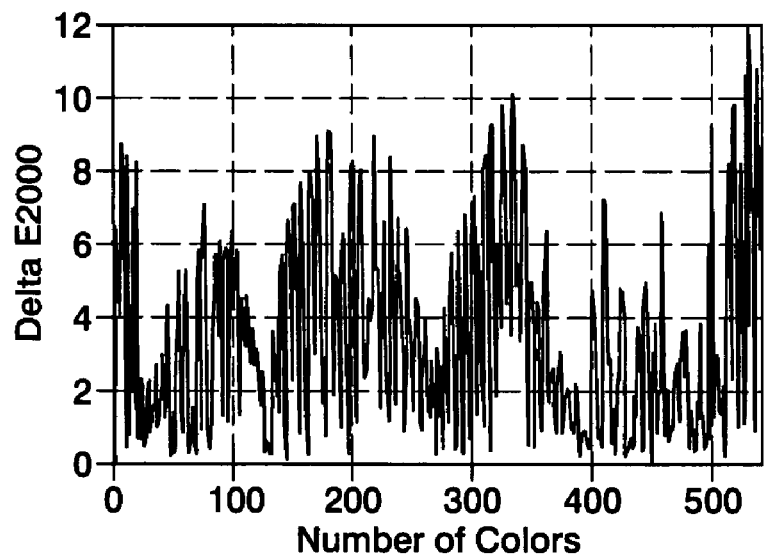
FIGS. 5A-5D illustrate DeltaE2000 values computed for a first simulation according to a conventional mapping of target colors.
Figure 5B:
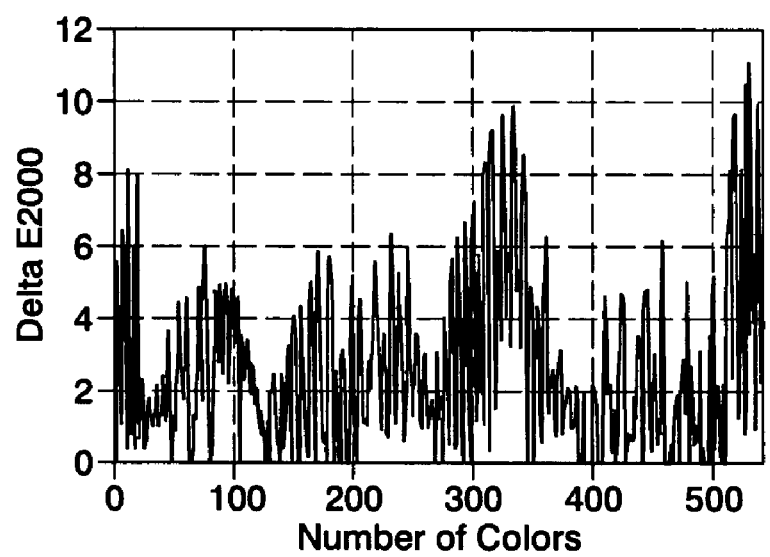
Figure 5C:
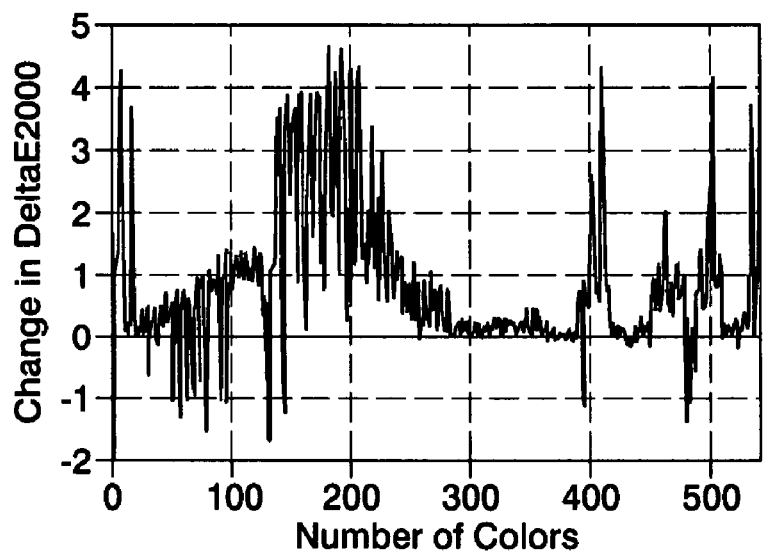
Figure 5D:
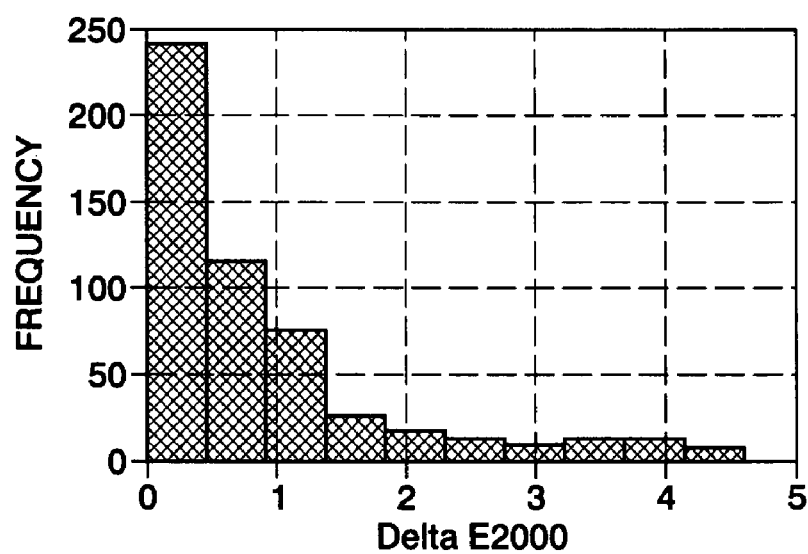

The results of the scenario described above are shown in FIGS. 5A and 5B for the "New Gamut" and "Old Gamut" respectively. 62 colors have a deltaE2000 equal to zero in the "Old Gamut" since these colors are inside the "Old gamut". It is important to highlight that the shift of the "New Gamut" has moved away from all the colors and that is why we see higher values of the deltaE2000 in the "New Gamut" case than in the "Old Gamut" one. All the 542 colors are outside the "New Gamut." FIG. 5C shows the difference between the deltaE2000 values of both approaches. FIG. 5D shows a histogram of the absolute difference between the deltaE2000 values of both approaches. It is easy to see for this case that if the mapped target values of the "Old Gamut" approach are used when the gamut has shifted, then the control algorithms will obtain poor results because of the differences existing between the two gamuts.

Figure 6A:
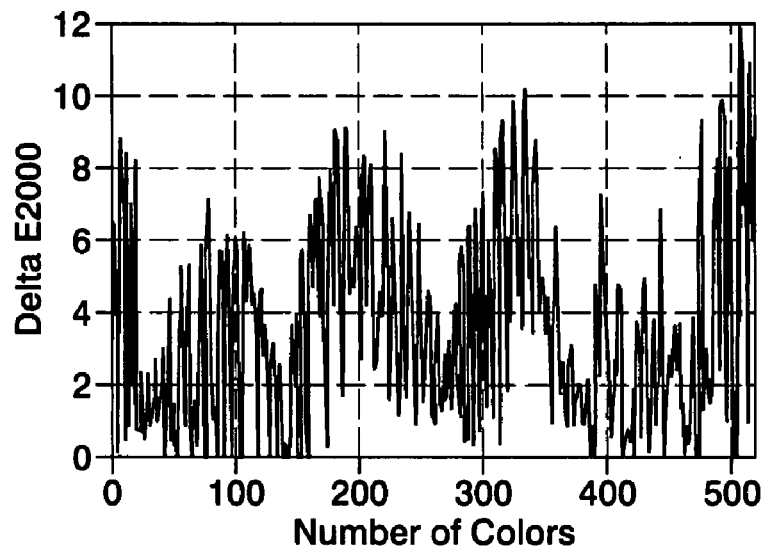
FIGS. 6A-6D illustrate DeltaE2000 values computed for a second simulation to map out gamut target colors according to an exemplary embodiment of this disclosure.
Figure 6B:
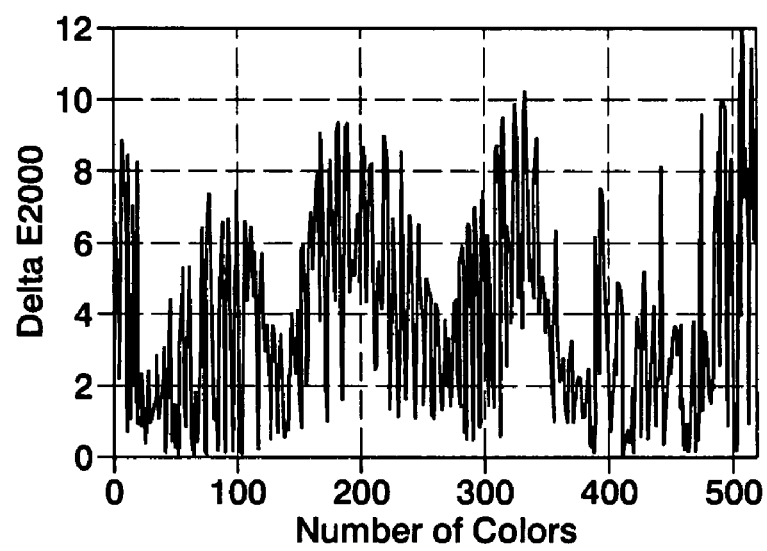
Figure 6C:
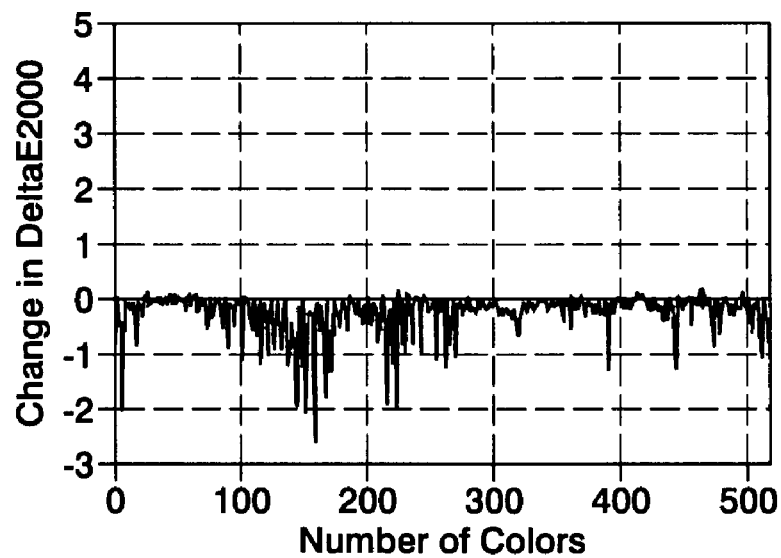

Now, we compare the results of the "New Gamut" mapping method to the one proposed here, "Dynamic Mapping." To do this, we select option (2) in the fourth item in [0082]. An algorithm that satisfies these characteristics has been described in Ref. [1]. This algorithm is called Multi-Input Multi-Output (MIMO) Model Predictive Controller (MPC), and it is run with the "Old Gamut," that is, we do not know any information about the shift that has taken place on the printer's gamut, we obtain the results shown in FIG. 6. Note that the MIMO MPC algorithm is run for 4 iterations with the printer characterization of the "Old Gamut" and obtain the mapped L*a*b* values as described in the second candidate function in [0082]. Ideally, the results of the "New Gamut" mapping method, which has complete information about the "New Gamut" gamut surface, and the "Dynamic Mapping" should be the same if the latter is able to map the spot colors to the current surface of the printer's gamut. FIGS. 6A and 6B show the deltaE2000 values between the original $L_t*a_t*b_t*$ target values and the mapped L*a*b* values for both the "New Gamut" and the "Dynamic Mapping." Clearly, the Dynamic mapping method seeks to map the out of gamut colors into the surface of the "New Gamut" even though it does not have information about the shift of the gamut. This fact can be seen in FIGS. 6C and 6D, and can be also compared to FIGS. 5C and 5D to observe the improvement of the "Dynamic Mapping" method over the "Old Gamut" one.

Figure 7A:
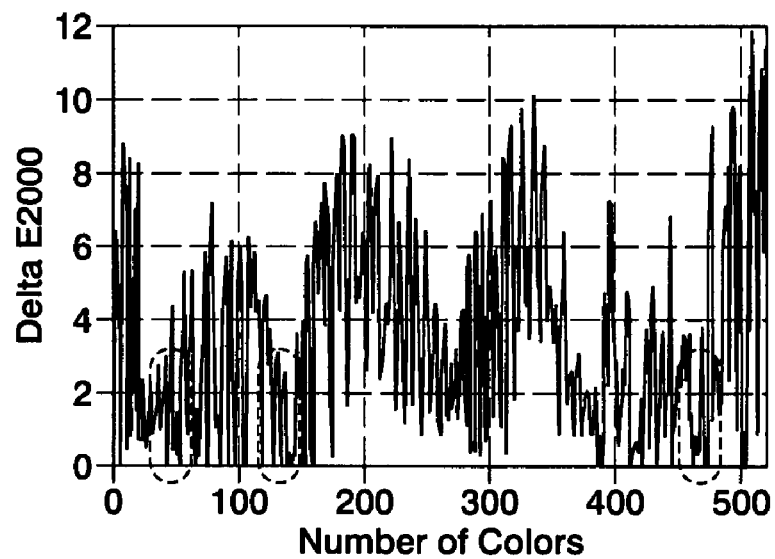
FIGS. 7A-7D illustrate DeltaE2000 values computed for a third simulation according to a conventional mapping of out-of-gamut target colors.
Figure 7B:
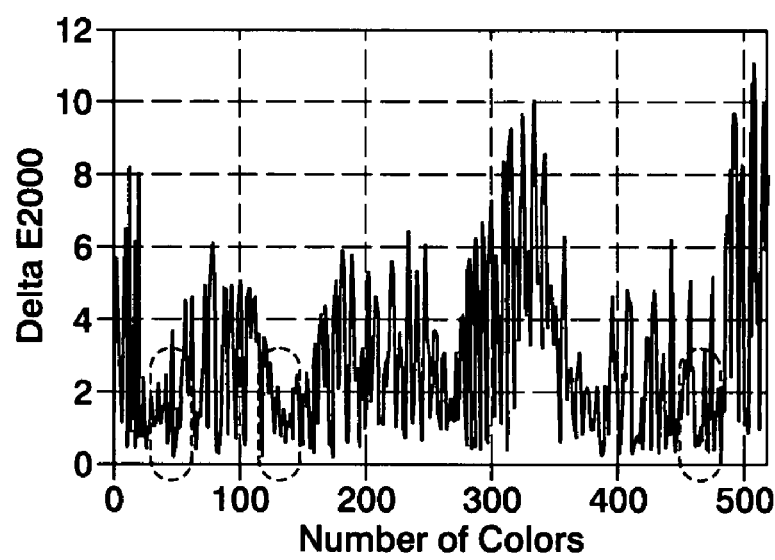
Figure 7C:
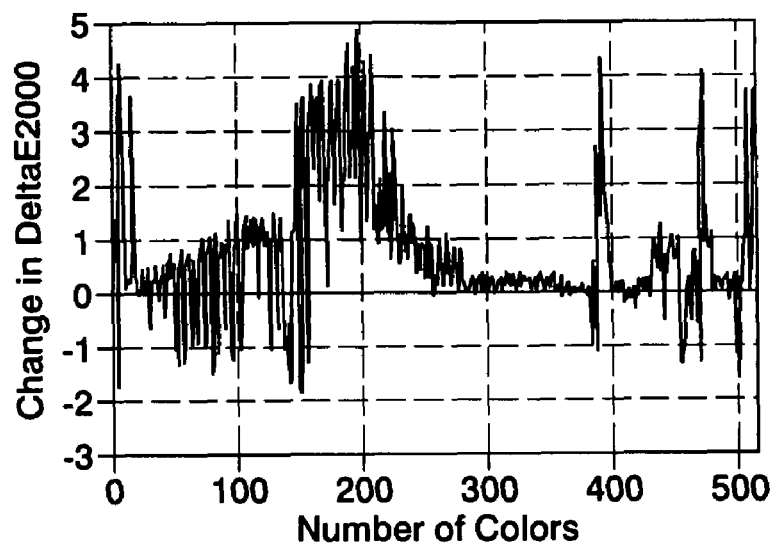
Figure 7D:
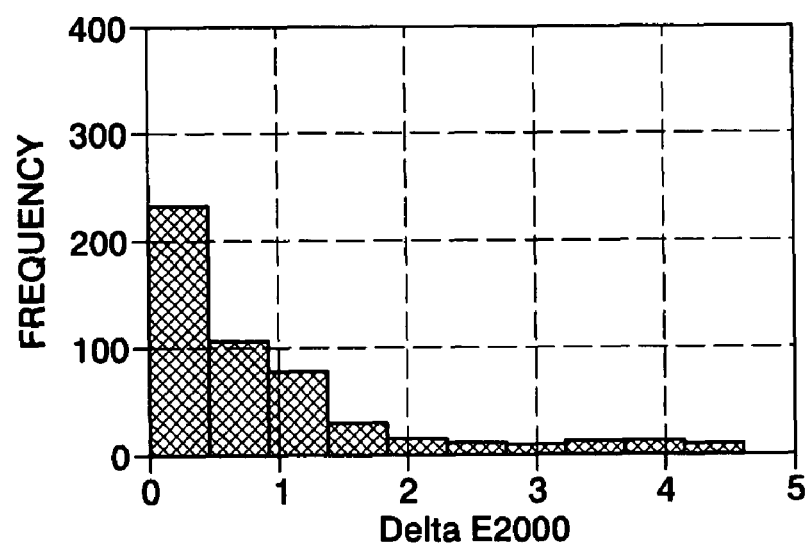
Figure 8A:
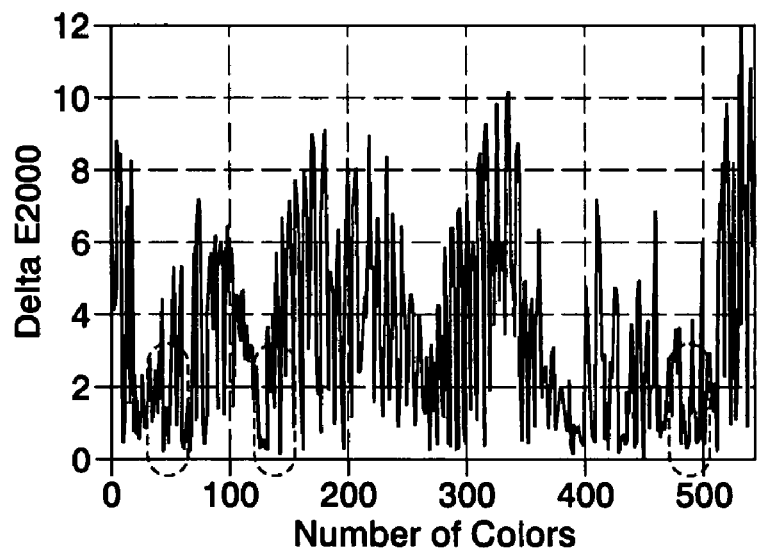
FIGS. 8A-8D illustrate DeltaE2000 values computed for a fourth simulation to map out-of-gamut target colors according to an exemplary embodiment of this disclosure.
Figure 8B:
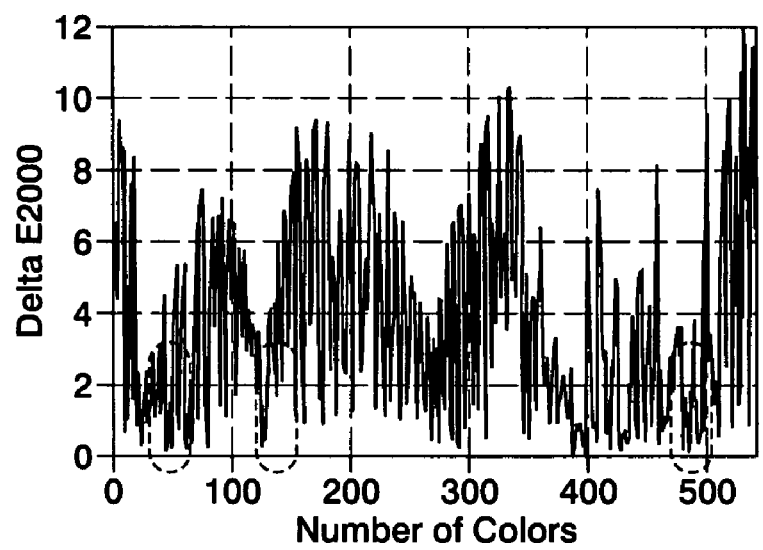
Figure 8C:
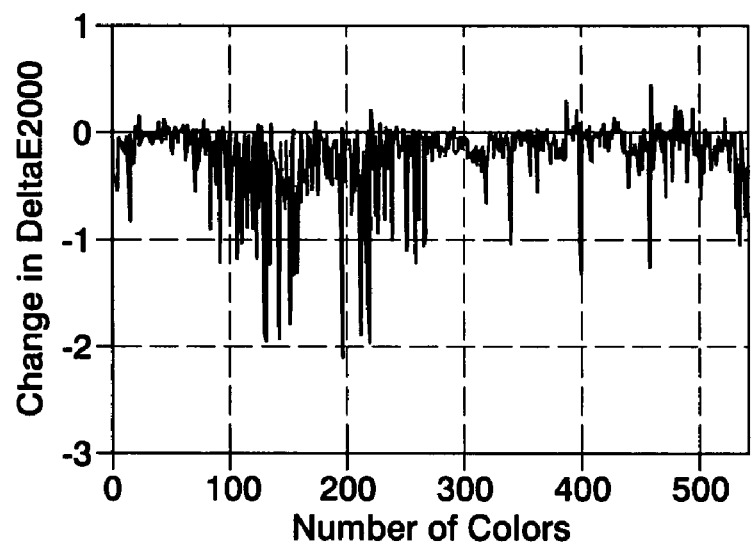
Figure 8D:
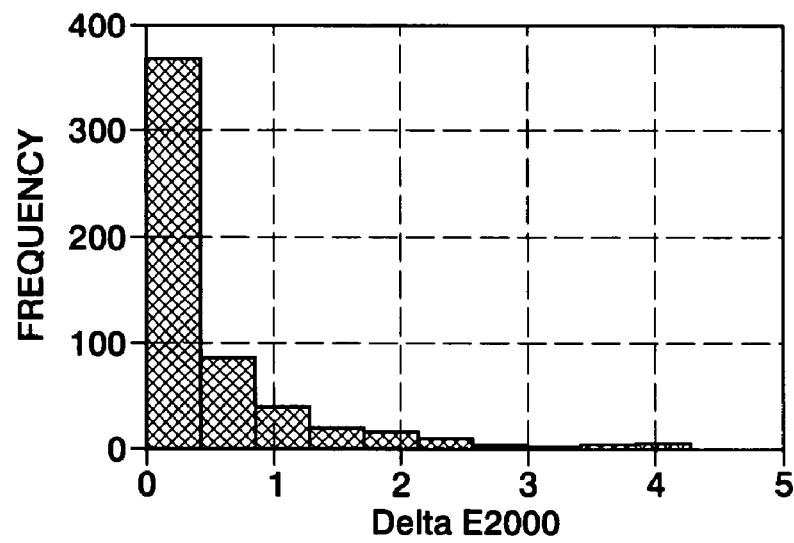

On the other hand, we now show that the "Dynamic Mapping" method is also capable of detecting colors that are moved from outside the gamut to inside when the gamut shifts using second set of data. FIG. 7 shows first the results when the surfaces of the "Old Gamut" and "New Gamut" are known. Again, we can observe here that if the old mapped target values for the spot colors are used all the time, then there are colors where this method produces poor results. Some spot colors have been encircled in FIGS. 7A and 7B to highlight the fact that they were outside of the "Old Gamut" and they are now inside the "New Gamut" (e.g., see where the deltaE2000 values are equal to zero for some colors inside the ovals). FIGS. 7C and 7D show how bad spot colors could be reproduced if the mapping of these colors are not updated. Next we show in FIG. 8 if the "Dynamic Mapping" method can match the results obtained by the "New Gamut" results in FIG. 7. FIGS. 8A and 8B show the good results obtained by the "Dynamic Mapping" approach. Observe the performance obtained where the ovals are located, where it can be seen that the colors, in general, that are now inside of the "New Gamut" have been mapped closely to the best location. FIGS. 8C and 8D confirm the good results for this case and can also be compared to the FIGS. 7C and 7D to have an idea of the improvement of the "Dynamic Mapping" over the "Old Gamut" method.

We want to highlight the following:

If we use the mapped L*a*b* values determined using the "Old Gamut" boundary then not all the colors generated by the ASCE will result in the desired match since some of the mapped targets are currently outside the "New Gamut."

Even though the "Dynamic Mapping" method does not have any information about the "New Gamut," it was able to find very well while iterating on the printer, where the colors should be mapped to for the "New Gamut" boundary. To see this, compare the differences between the deltaE2000 values of the lines in FIGS. 6 and 8. This comparison proves that the "Dynamic Mapping" algorithm, without the knowledge of new boundary, was able to find the mapping required for "New Gamut" as in FIGS. 6 and 8.

Figure 6D:
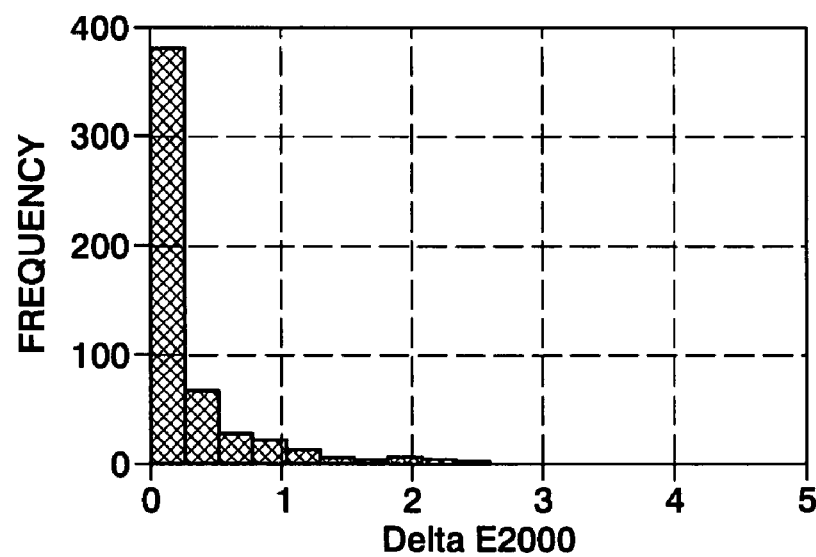

The cases where the "Dynamic Mapping" algorithm was not able to correctly match where the colors should be mapped to can be seen on the histograms in FIGS. 6D and 8D. The histograms represent the difference in deltaE2000 values between the "Dynamic Mapping" results and the case where the "New Gamut" is completely known. Most of the colors have a difference less than 1 deltaE2000, which will not be perceived by the human eye. Only a few colors have a deltaE2000 difference greater than 1 and less than 2.5.

Therefore, the performance of the "Dynamic Mapping" is really good considering that it does not know any information about the changes taken place in the "Old Gamut." The dynamic gamut mapping can also provide mapping of colors to interior region of the printer's gamut.

This method is one of the basic steps necessary to have evolutionary control applications that adapt themselves to changes that take place in the printer. The new approach eliminates the need for printer characterization for the purpose of gamut mapping. Other control algorithms (e.g., optimal, Nelder-Mead, singular perturbation stochastic algorithms etc.), can also be used to practice this disclosure.

While the present discussion has been illustrated and described with reference to specific embodiments, further modification and improvements will occur to those skilled in the art. For example, different cost functions as well as methods to compute multiple gain matrices for MIMO systems could also be used in the implementation of MIMO MPC proposed here. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this disclosure is not limited to the particular forms illustrated and that it is intended in the appended claims to embrace all alternatives, modifications, and variations which do not depart from the spirit and scope of the embodiments described herein.

It will be appreciated that several of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A method of mapping spot colors within a printer's gamut comprising:
   (A) generating a first estimated in-gamut printer device dependent color space representation associated with an out-of-gamut target color;
   (B) printing the first estimated printer device dependent color space representation associated with the target color;
   (C) generating a first measured spot color representation of the target color by measuring the spectral properties associated with the target color;
   (D) executing a gamut mapping control system, wherein the gamut mapping control system generates a first set of two or more estimated in-gamut printer device dependent color space representations associated with the target color based on two or more respective gain matrices, and selects the estimated color space representation nearest to the target color as a second estimated printer device dependent color space representation associated with the target color and
   (E) printing the second estimated printer device dependent color space representation associated with the target color.

2. The method of mapping spot colors within a printer's gamut according to claim 1, wherein the gamut mapping control system executes a printer model predictive control system comprising:
   during each iteration of executing step (D), generating a $N^{th}$ set of two or more estimated in-gamut printer device dependent color space representations associated with the target color, wherein each of the two or more estimated in-gamut printer device dependent color space representations associated with the $N^{th}$ set are based on the two or more respective gain matrices;
   selecting a gain matrix associated with the estimated color space representations nearest to the target color from the $N^{th}$ set of two or more estimated in-gamut printer device dependent color space representations associated with the target color; and
   associating the estimated color space representation of the target color generated by the selected gain matrix during each iteration with the respective estimated printer device dependent color space representation associated with the target color.

3. The method of mapping spot colors within a printer's gamut according to claim 1, further comprising:
   (F) measuring the spectral properties associated with the printed second estimated printer device dependent color space representation associated with the target color; and
   executing the gamut mapping control system, wherein the gamut mapping control system generates a second set of two or more estimated in-gamut printer device dependent color space representations associated with the target color, based on two or more respective gain matrices and selects the estimated color space representation nearest to the target color as a third estimated printer device dependent color space representation associated with the target color.

4. The method of mapping spot colors within a printer's gamut according to claim 1, wherein the two or more respective gain matrices represent two or more respective poles associated with a Jacobian matrix associated with the printer's characterization data.

5. The method of mapping spot colors within a printer's gamut according to claim 1, further comprising:
   electronically storing the second estimated printer device dependent color space representation for future access by the printer's controller for printing the target spot color.

6. The method of mapping spot colors within a printer's gamut according to claim 1, further comprising:
   iteratively executing steps (D), (E) and (C) for a predetermined number of iterations N, where N is equal to or greater than two, and each iteration generates a respective set of two or more estimated in-gamut printer device dependent color spaced representations associated with the target color, based on two or more respective gain matrices.

7. A gamut mapping control system comprising:
   an image rendering device;
   a spectral measurement device;
   a gamut mapping controller operatively connected to the image rendering device and spectral measurement device, wherein the gamut mapping controller is configured to map spot colors within the gamut of the image rendering device by executing a gamut mapping process to generate an estimated color space representation of a target color, the gamut mapping process comprising:

(A) generating a first set of two or more estimated image rendering device dependent color space representations associated with the target color, wherein the set is based on a predictive model associated with the image rendering device and the set of two or more estimated representations of the target color includes image device dependent color space estimations for a range of gamut mapping controller responses based on one or more parameters;

(B) selecting the estimated image rendering device dependent color space representation generated in step (A) which is nearest to the target color, (G) image rendering the estimated image rendering device dependent color space representation selected in step (B);

(H) measuring the spectral properties of the image rendering associated with the target color in step (G); and (I) generating a target color deviation based on differences associated with the target color and image rendered in step (G), wherein the two or more respective gain matrices are functions of two or more Jacobian matrices associated with the printer's characterization data.

8. A gamut mapping control system comprising:
an image rendering device;
a spectral measurement device;
a gamut mapping controller operatively connected to the image rendering device and spectral measurement device, wherein the gamut mapping controller is configured to map spot colors within the gamut of the image rendering device by executing a gamut mapping process to generate an estimated color space representation of a target color, the gamut mapping process comprising:
(A) generating a first set of two or more estimated image rendering device dependent color space representations associated with the target color, wherein the set is based on a predictive model associated with the image rendering device and the set of two or more estimated representations of the target color includes image device dependent color space estimations for a range of gamut mapping controller responses based on one or more parameters;
(B) selecting the estimated image rendering device dependent color space representation generated in step (A) which is nearest to the target color;
(G) image rendering the estimated image rendering device dependent color space representation selected in step (B);
(H) measuring the spectral properties of the image rendering associated with the target color in step (G); and
(I) generating a target color deviation based on differences associated with the target color and image rendered in step (G).

9. The gamut mapping control system according to claim 8, the gamut mapping controller configured to execute steps (A), (B), (G), (H) and (I) for N iterations, where N is equal to or greater than one, and each iteration of step (A) is based on the spectral properties measured in step (H) of the previous iterations.

10. The gamut mapping control system according to claim 9, wherein for each iteration of step (A), the predictive model is configured to generate a second set of two or more estimated image rendering device dependent color space representations associated with the target color by estimating the resulting set of two or more estimated image rendering device dependent color space representations generated by the remaining iterations, and for each subsequent iteration of step (B) the gamut mapping controller is configured to select the estimated image rendering device dependent color space representation of the first set based on the estimated image rendering device dependent color space within the second set nearest to the target color.

11. A gamut mapping control system comprising:
an image rendering device;
a spectral measurement device;
a gamut mapping controller operatively connected to the image rendering device and spectral measurement device, wherein the gamut mapping controller is configured to map spot colors within the gamut of the image rendering device by executing a gamut mapping process to generate an estimated color space representation of a target color, the gamut mapping process comprising:
(A) generating a first set of two or more estimated image rendering device dependent color space representations associated with the target color, wherein the set is based on a predictive model associated with the image rendering device and the set of two or more estimated representations of the target color includes image device dependent color space estimations for a range of gamut mapping controller responses based on one or more parameters;
(B) selecting the estimated image rendering device dependent color space representation generated in step (A) which is nearest to the target color;
(D) prior to the execution of step (A), image rendering a first estimated image device dependent color space representation associated with the target color;
(E) measuring the spectral properties of the image rendering associated with the target color in step (D); and
(F) generating a target color deviation based on differences associated with the target color and image rendered in step (D),
wherein the target color deviation is a parameter used by the predictive model in step (A).

12. The gamut mapping control system according to claim 11, the gamut mapping process further comprising:
electronically storing the estimated color space representation selected in step (B) for image rendering the target color on the image rendering device.

13. The gamut mapping control system according to claim 11, further comprising:
executing steps (E), (F), (A) and (B) for N iterations, where N is equal to or greater than 1, and each iteration generates a nearer image rendering of the target color.

14. The gamut mapping control system according to claim 11, the gamut mapping controller comprising:
a set of two or more gain matrices associated with distinct gamut mapping controller operating characteristics, wherein the gamut mapping process generates the set of two or more estimated image rendering device dependent color space representations associated with the target color, based on the set of respective two or more gain matrices.

15. The gamut mapping control system according to claim 11, wherein the image rendering device is a color printer.

16. The mapping control system according to claim 15, wherein the color space representations are selected from the group consisting of CMYK, La*b*, RGB, and CIE Lab.

17. A method of mapping spot colors within a printer's gamut comprising:
(A) generating a first estimated in-gamut printer device dependent color space representation associated with an out-of-gamut target color;

(B) printing the first estimated printer device dependent color space representation associated with the target color;
(C) generating a first measured spot color representation of the target color by measuring the spectral properties associated with the target color; and
(D) executing a gamut mapping control system, wherein the gamut mapping control system generates a first set of two or more estimated in-gamut printer device dependent color space representations associated with the target color based on two or more respective gain matrices, and selects the estimated color space representation nearest to the target color as a second estimated printer device dependent color space representation associated with the target color,
wherein the predictive model is based on a plurality of gain matrices derived from the Jacobian matrix associated with the image rendering device characterization data.

* * * * *